(12) United States Patent
Kim et al.

(10) Patent No.: US 7,212,671 B2
(45) Date of Patent: May 1, 2007

(54) METHOD OF EXTRACTING SHAPE VARIATION DESCRIPTOR FOR RETRIEVING IMAGE SEQUENCE

(75) Inventors: Whoi-Yul Kim, Dept. of Electronics Engineering, Hanyang University, Haengdang-dong, Seongdong-gu, Seoul 133-791 (KR); Min-Seok Choi, Seoul (KR); Young-Min Kong, Seoul (KR)

(73) Assignees: Whoi-Yul Kim (KR); KT Corporation (KR)

( * ) Notice: Subject to any disclaimer, the term of this patent is extended or adjusted under 35 U.S.C. 154(b) by 719 days.

(21) Appl. No.: 10/482,234

(22) PCT Filed: Jun. 19, 2002

(86) PCT No.: PCT/KR02/01162

§ 371 (c)(1),
(2), (4) Date: Dec. 18, 2003

(87) PCT Pub. No.: WO02/103562

PCT Pub. Date: Dec. 27, 2002

(65) Prior Publication Data

US 2004/0170327 A1    Sep. 2, 2004

(30) Foreign Application Priority Data

Jun. 19, 2001   (KR) .............................. 2001-34595

(51) Int. Cl.
   *G06K 9/46*   (2006.01)
(52) U.S. Cl. ......................... 382/190; 707/3
(58) Field of Classification Search ................ 382/100, 382/103, 190; 707/3
See application file for complete search history.

(56) References Cited

U.S. PATENT DOCUMENTS 5,546,572 A * 8/1996 Seto et al. ..................... 707/5

(Continued)

FOREIGN PATENT DOCUMENTS

| JP | 2000-287165 | 10/2000 |
| JP | 2000-358192 | 12/2000 |
| JP | 2001-86434  | 3/2001  |
| KR | 2000-57859  | 9/2000  |

OTHER PUBLICATIONS

Nam, J. and Tewfik, A.H.; (Progressive resolution motion indexing of video object; Acoustics, Speech, and Signal Processing, 1998. ICASSP '98. Proceedings of the 1998 IEEE International Conference on vol. 6, May 12-15, 1998 pp. 3701-3704 vol.*

(Continued)

*Primary Examiner*—Vikkram Bali
*Assistant Examiner*—Anand Bhatnagar
(74) *Attorney, Agent, or Firm*—Blakely Sokoloff Taylor & Zafman

(57) ABSTRACT

A method for extracting a shape variation descriptor from image sequence data for content-based image retrieval is disclosed. The method for extracting the shape variation descriptor from image sequence data for content-based image retrieval, image sequence data representing variation of object through a plurality of frames, the method includes the steps of creating a frame including variation information and shape information by accumulating the plurality of frames, the centroid of object regions in each frame aligned; and extracting shape descriptor from the frame.

30 Claims, 17 Drawing Sheets

U.S. PATENT DOCUMENTS

| | | | |
|---|---|---|---|
| 5,802,361 A * | 9/1998 | Wang et al. | 382/217 |
| 5,893,095 A * | 4/1999 | Jain et al. | 707/6 |
| 5,915,250 A * | 6/1999 | Jain et al. | 707/100 |
| 6,182,069 B1 * | 1/2001 | Niblack et al. | 707/6 |
| 6,643,387 B1 * | 11/2003 | Sethuraman et al. | 382/107 |
| 6,785,429 B1 * | 8/2004 | Senoh | 382/305 |
| 6,925,207 B1 * | 8/2005 | Sezan et al. | 382/209 |
| 2002/0107850 A1 * | 8/2002 | Sugimoto et al. | 707/3 |

OTHER PUBLICATIONS

Motion-Shape Descriptor for Image Sequence using Zernike Moment, (13th Conference for processing and understanding of moving pictures, Jan. 10-12, 2001).

Shape Sequence Descriptor for Describing Shape Variation by Object Movement, (14th Conference for processing and understanding of moving pictures, Jan. 9-11, 2002).

Proposal for Shape-sequence Descriptor for motion-description, (International Organisation for Standardisation of ISO/IEC JTC1/SC29/WG11 Coding of Moving Pictures and Audio, pp. 1-5).

* cited by examiner

FIG. 7B
FIG. 7C
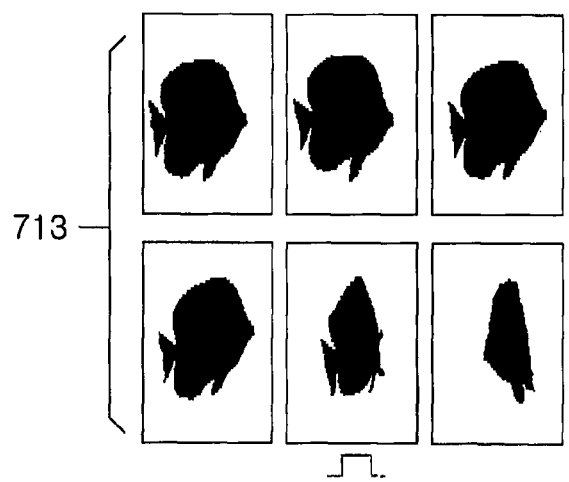
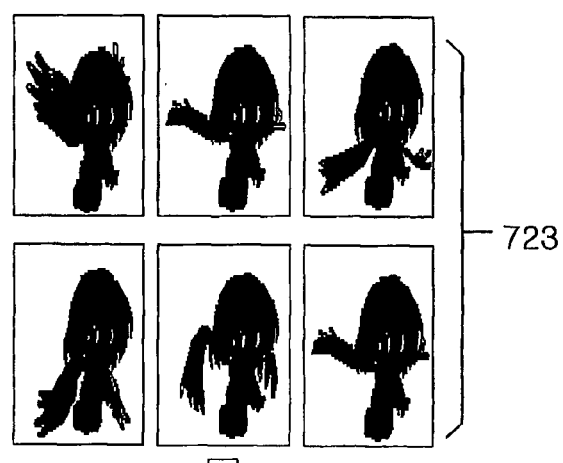
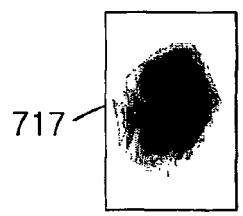
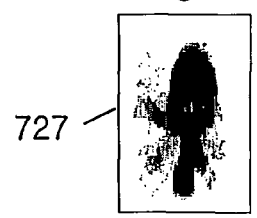

(A) REAL PART    (B) IMAGINARY PART (A) REAL PART (B) IMAGINARY PART

FIG. 14A  FIG. 14B
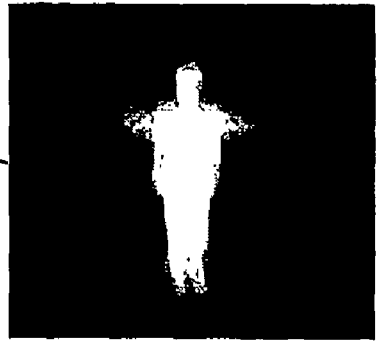
1307
1407
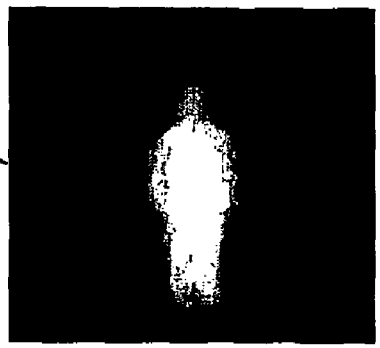
1309
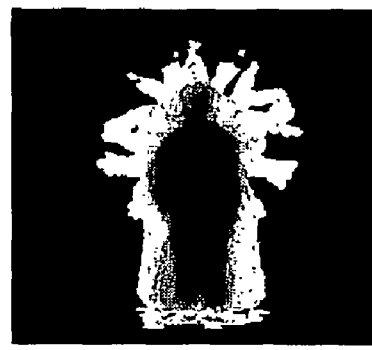
1409

METHOD OF EXTRACTING SHAPE VARIATION DESCRIPTOR FOR RETRIEVING IMAGE SEQUENCE

The present patent application is a non-provisional application of International Application No. PCT/KR02/01162, filed Jun. 19, 2002.

TECHNICAL FIELD

The present invention relates to the retrieval of video data; and, more specifically, to a method for extracting a shape variation descriptor for retrieving sequence of images from video data based on the content of images or the description of the content of objects in images, and a computer interpretable recording medium storing instructions for implementing the method.

BACKGROUND ART

Recently, as various Internet techniques and multimedia have been developed rapidly, amounts of multimedia data also increase exponentially as well. Therefore, effective management and retrieval of multimedia data are necessitated.

However, since amounts of multimedia data are enormous and multimedia data are mixed with various types of image, video, audio, text and so forth, it is practically impossible to retrieve relevant multimedia directly from a multimedia database.

Therefore, it becomes necessary to develop a technology for retrieving and managing multimedia data effectively. Among those key technologies, an important one is multimedia index description that extracts index information to be used for retrieval and exploration.

In other words, a user should be able to retrieve a specific multimedia data through a pre-processing procedure by extracting a descriptor that describes a unique characteristics of each multimedia data when a multimedia database is constructed; and a procedure for computing a similarity distance between the descriptor of query multimedia data that the user requests and each descriptor of data in a multimedia database.

Because of indispensability for multimedia data retrieval, International Organization for Standardization (ISO), International Electrotechnical Commission (IEC) and Joint Technical Committee 1 (ISO/IEC JTC 1) set forth a standard for content-based multimedia retrieval technology with regard to Moving Picture Experts Group-7 (MPEG-7).

Currently, pieces of information on such characteristics as shape, color, text, motion and so on are used for multimedia data description.

Meanwhile, motion information is an important characteristics for retrieving video data. Video data retrieval is a method for retrieving similar video data by extracting a motion descriptor which describes characteristic motions of an object expressed by sequences that constitutes video data and estimating a similarity distance between query video data inputted by an user and the motion descriptor of the video data stored into a database.

In this case, there are various types of the motion descriptor; that are, a camera motion which describes various motions of a camera, a motion trajectory which describes a trajectory of a moving object, a parametric motion which describes motions of a whole image and a motion activity which expresses quantitatively activeness of an image motion. Effectiveness of the video data retrieval method with use of the motion descriptor depends on ability of the descriptor in how well it can describe characteristics of video data.

The motion trajectory descriptor can be one of the most frequently used descriptor to describe a spatiotemporal trajectory of a moving object. The motion trajectory descriptor is classified as a global motion and an object motion. The global motion represents a camera motion, i.e., motions of the camera and the object motion represents an object in a user's interest, i.e., motions of the object.

The global motion describes a motion with a centroid of a square that minimally encompasses a corresponding object. In this case, based on information about an object's position, velocity, acceleration and so on, a trajectory of an x direction of the centroid in the moving object is expressed with a value shown from the following equation 1.

$$\forall t \in [t_0, t_1], x(t-t_0) = x_0 + v_x(t-t_0) + \frac{1}{2}a_x(t-t_0)^2 \quad \text{Eq. (1)}$$

$x_0$: a position when $t=t_0$
$x(t-t_0)$: x cordinate
$v_x$: velocity
$a_x$: acceleration Similar to the X direction, y and z directions of the centroid are expressed as the following equation 2.

$$\forall t \in [t_0, t_1], y(t-t_0) = y_0 + V_y(t-t_0) + \frac{1}{2}a_y(t-t_0)^2 \quad \text{Eq. (2)}$$

$$z(t-t_0) = z_0 + v_z(t-t_0) + \frac{1}{2}a_z(t-t_0)^2$$

$y(t-t_0)$: y cordinate
$z(t-t_0)$: zoom-in/out of a camera

That is, the global motion represents a characteristic that expresses a level of velocity with which the object is moving at certain two points.

A distance between two general motion trajectories of the objects is expressed as a following equation 3.

$$d(D1, D2) = \sum_i \left[ \alpha \frac{(x1_i - x2_i)^2 + (y1_i - y2_i)^2 + (z1_i - z2_i)^2}{\Delta t_i} + \beta \frac{(v1_{xi} - v2_{xi})^2 + (v1_{yi} - v2_{yi})^2 + (v1_{zi} - v2_{zi})^2}{\Delta t_i} + \chi \frac{(a1_{xi} - a2_{xi})^2 + (a1_{yi} - a2_{yi})^2 + (a1_{zi} - a2_{zi})^2}{\Delta t_i} \right] \quad \text{Eq. (3)}$$

$\Delta t_i$: time at i th characteristic
$\alpha, \beta, \chi$: weight

However, a method for content-based video data retrieval through the use of the conventional motion trajectory descriptor has a characteristic merely about the global motion and this means that the above descriptor describes solely a motion trajectory of an object without any information on motions of the object. Because of this characteristic, identical motion trajectories of the objects that possess different shapes and motions express the same characteristic, resulting in the following limitations.

Firstly, a characteristic of a user's perception cannot be accurately reflected and motions of the object, i.e., shapes of the object that change in accordance with the time cannot be described. As a result, in case that characteristics with respect to the global motion are similar, the video data, that the user feels different because they are originated from different objects, are retrieved incorrectly as similar video data. In other words, the motion trajectory descriptor describes only motions of the object without information on shapes of the object, and thus, the same characteristic is expressed even for the object having the same motion but the different shape. For instance, in a perspective of human understanding, walking of a man and that of an animal are perceived as different motions, however, the motion trajectory descriptor represents them as the same characteristic motion.

Secondly, since motions of the object are different even for the identical object, the motion trajectory descriptor cannot discriminate motions of different objects in case that characteristics with respect to the global motion are similar although each has different image sequence data.

DISCLOSURE OF THE INVENTION

It is, therefore, an object of the present invention to provide a method for extracting a shape variation descriptor capable of discriminating shapes of image sequence data, wherein a portion of an object moves or a motion trajectory of the object is short in a smaller number of frames and shape of the portion of the object changes greatly, through the use of a shape descriptor coefficient obtained by capturing video data that expresses motions of the object as continuous image frames, i.e., image sequences, and superposing the objects included in each image sequence. It is another object of the present invention to provide a computer interpretable recording medium storing instructions for implementing the method.

Those ordinary people skilled in the art can easily comprehend other objects and advantages of the present invention from the drawings, the detailed description in the specification and the claims.

In accordance with an aspect of the present invention, there is provided a method for extracting a shape variation descriptor in order to retrieve content-based image sequence data that express motions of an object through a plurality of frames, comprising the steps of: selecting a predetermined number of the frames from the image sequence data; transforming the frame into a frame including information about the object only that is separated from a background of the frame; aligning the object into a predetermined locus of the frame; superposing a number of the aligned frames so as to generate one frame, that is, shape variation map (SVM) including information about motions of the object and information about shapes of the object; and extracting the shape variation descriptor with respect to one SVM generated.

In accordance with another aspect of the present invention, there is also provided a computer interpretable recording medium storing instructions in a processor prepared content-based retrieval system for extracting a shape variation descriptor for the content-based retrieval with respect to an image sequence data that expresses motions of an object through a plurality of frames, comprising: selecting a predetermined number of the frames from the image sequence data; transforming the frame into a frame that includes information about the object only that is separated from a background of the frame; aligning the object into a predetermined locus of the frame; superposing a number of the aligned frames so as to generate one frame, that is, shape variation map (SVM) including information about the object motion and information about the object shape; and extracting the shape variation descriptor with respect to the generated one SVM.

A shape variation descriptor in accordance with the present invention describes shape variations that occur in a collection of binary image of objects. The collection of binary image objects includes an image set divided orderly from a video. A main function of the shape variation descriptor is to retrieve a collection of images having similar shapes with regardless of orders or the number of frames for each collection. In case of consecutive frames, the shape variation descriptor is used in retrieving shape sequences expressed by the frame set of video segments in a perspective of similar shape variations consistent with motions of the object.

In accordance with the present invention, static and dynamic variations are extracted to obtain the shape variation descriptor.

In accordance with a preferred embodiment, a video clip selected by a user, i.e., an image sequence is captured so as to generate a frame set from the corresponding video clip. Ideally, it is possible to include a procedure of sub-sampling, wherein elements of the frame set are reselected by skipping several frames from the selected image frames in accordance with a predetermined basis and reconstructed as a series of image sequences.

Binarization is performed to each frame that constitutes the frame set so that information about the object included in each frame is separated from information about a background. A centroid of the object separated from the binary image is aligned at a predetermined point, and then, all frames get superimposed to accumulate values assigned to pixels of each frame. As the accumulated pixel values are normalized into a predetermined interval, e.g., [0,255] or [0,1] of a grayscale, a shape variation map (SVM) is generated.

The SVM in accordance with the preferred embodiment includes information about motions and shapes of the object because information about the superimposed images is included in the SVM.

Static shape variation is extracted as a characteristic with respect to shape variations of the image sequence provided from the SVM by employing a shape variation descriptor extraction method including a region-based shape descriptor. Then, a similarity is estimated within the video database through the use of this extracted characteristic so as to retrieve user wanted image sequence data.

The SVM in accordance with the present invention has the highest level of superposition at the centroid of the object and this fact means that a portion of the object without movement has a higher weight compared to a portion of the object in motions. In accordance with another preferred embodiment of the present invention, the portion of the object in motions are set to have a higher weight so as to capture motions of the object accurately.

In accordance with another preferred embodiment of the present invention, the objects of the generated SVM are inversed except for the backgrounds, resulting in a negative shape variation map (NSVM).

The NSVM generated by following the above-preferred embodiment includes all pieces information on motions and shapes of the object since the information on the superimposed images contained each frame sequence is included in the NSVM.

Dynamic shape variation is extracted as a characteristic with respect to shape variations of the image sequence provided from the NSVM by employing a shape variation descriptor extraction method including a region-based shape descriptor. Then, a similarity is estimated within the video database through the use of this extracted characteristic so as to retrieve user wanted image sequence data.

In accordance with further preferred embodiment of the present invention, the static shape variation and the dynamic shape variation is assigned with a predetermined weight so as to calculate an arithmetic mean, which is a new characteristic of the corresponding image sequence. Based on this extracted characteristic, a similarity is estimated within the video database so that user wanted image sequence data can be retrieved.

BRIEF DESCRIPTION OF THE DRAWINGS

The above and other objects and features of the present invention will become apparent from the following description of the preferred embodiments given in conjunction with the accompanying drawings, in which:

FIGS. 7A and 7B are diagrams illustrating a procedure for superposing objects separated from a background in accordance with the preferred embodiment of the present invention;

FIGS. 14A, 14B and 15 are diagrams for describing differences between the SVM and a negative shape variation map (NSVM).

BEST MODE FOR CARRYING OUT THE INVENTION

Figure 1:
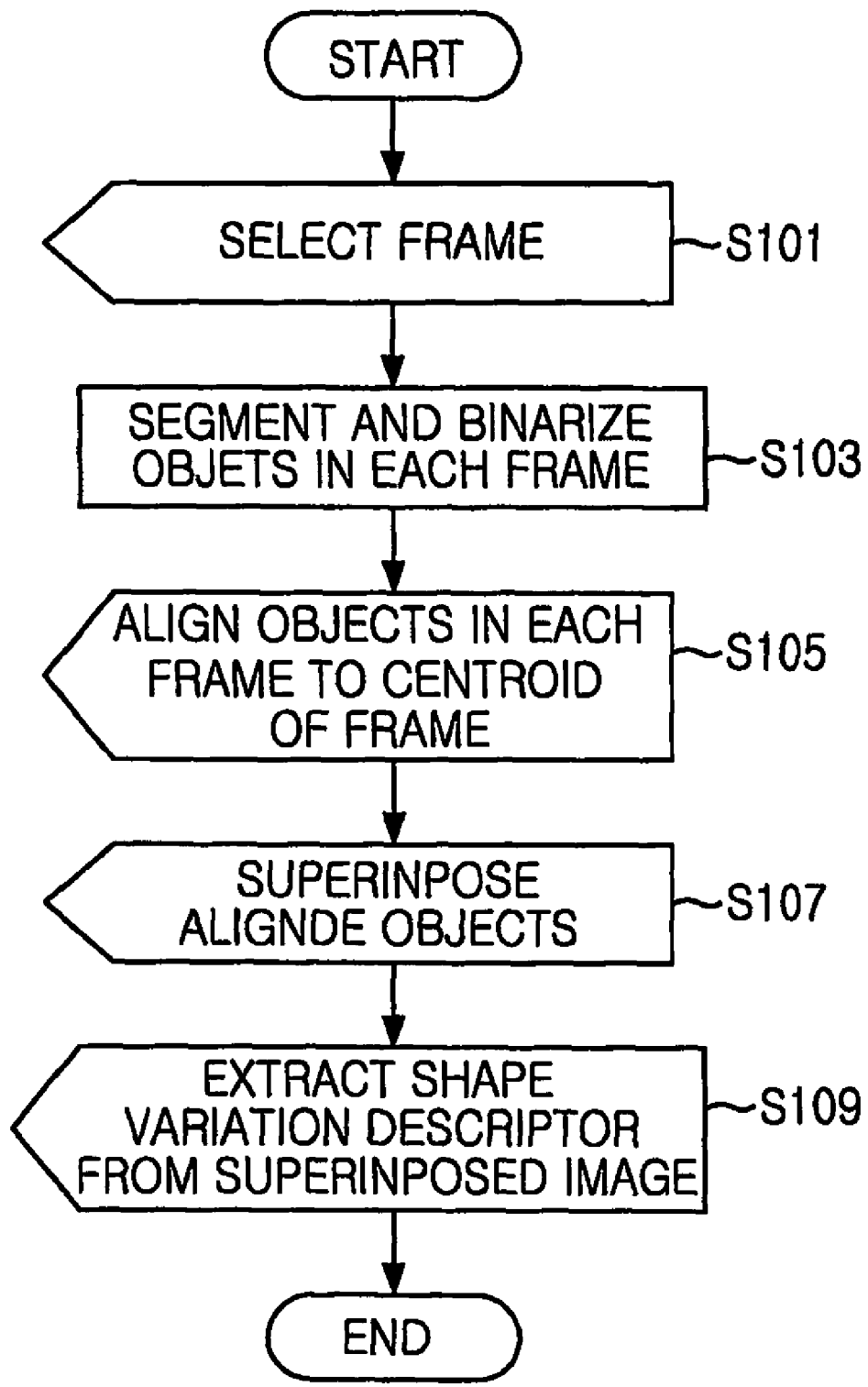
FIG. 1 is a flowchart illustrating a procedure for extracting a static shape variation descriptor in accordance with a preferred embodiment of the present invention.

Other objects and aspects of the invention will become apparent from the following description of the embodiments with reference to the accompanying drawings, which is set forth hereinafter. It should be noted that the same reference numeral is used for the same constitution referenced to each different drawing. Also, when related disclosed prior arts are found to confuse critical concepts of the present invention, description with regards to the related prior arts are omitted.

FIG. 1 is a flowchart showing a procedure for extracting a static shape variation descriptor in accordance with a preferred embodiment of the present invention. The static extraction procedure is required as a pre-step to a procedure for establishing an image sequence database and a procedure for retrieving image sequence data similar to query image sequence data.

Referring to FIG. 1, at step S101, the static shape variation descriptor extraction procedure starts with a frame selection for extracting the descriptor from the image sequence data.

Figure 2:
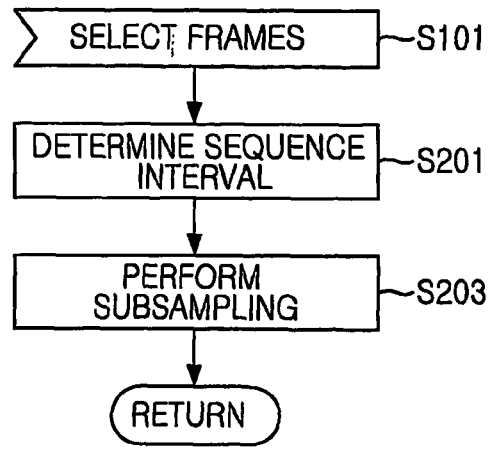
FIG. 2 is a flowchart, showing a frame selection procedure of FIG. 1.

FIG. 2 is a flowchart depicting detailed sub-steps of the frame selection step S101. At step S201, an interval for an image sequence, i.e., a video clip, is determined and at step S203, a sub-sampling with respect to the video clip is performed. At step S203, N numbers of consecutive frames $F_i$ that present motions of a particular object in the video clip are extracted and a frame set S is generated as the following:

$$S = \{F_1, F_2, F_3, \ldots, F_N\}$$

Next, with respect to the frame set S, a predetermined period, T, that is, image frames $F'_i$ are selected by jumping T numbers of the frames, and then, a frame set S' is constituted of M numbers of image frames as the following.

$$S' = \{F'_1, F'_2, F'_3, \ldots, F'_M\}$$

where, $$M \sim \frac{N}{T}$$

Meanwhile, it is apparent for those ordinary people skilled in the art that the period T for constituting the frame set S' can be randomly controlled according to the N numbers of the frames constituting the frame set S. In other words, at later step S107, the period T is selected such that the number of the frames becomes M under a consideration of a gray image interpolation step S403. Therefore, in case that N is not larger, T can be 1 where N=M and S=S', i.e., T=1 (N=M, S=S').

Also, the N numbers of the frames, extracted through the procedure for establishing the frame set S are generated from the procedure for extracting consecutive frames that present motions of the particular object. However, it is apparent that the N numbers of the frames can be randomly regulated according to the number of the video clips. That is, video data is conventionally constituted of 30 frames as per a second, whereas such image sequence data as Graphic Interchange Format (GIF) animation can be constituted with less a number of frames and in this case, the image sequence data can become the frame set S constituted with total frames of the video clip. Hence, it should be understood that the constitutional frames of the frame set S is not limitedly used only to the consecutive frames that present the motions of the particular object. At the image sequence retrieval procedure, since the number of the image sequence frames is normalized, it is possible to compare image sequences having different numbers of frames with each other, e.g., a slow motion image sequence is compared to an image sequence of motions in a regular speed.

After frame selection step S101, background for each frame is removed and only objects that are mainly in motion are extracted and binarized at step S103, so called an object extraction step.

Figure 3:
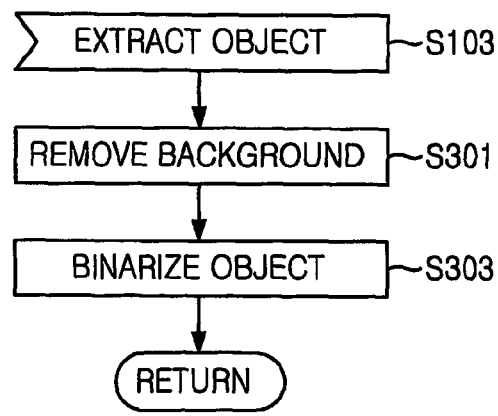
FIG. 3 is a flowchart, depicting an object extraction procedure of FIG. 1.

FIG. 3 is a flowchart illustrating the object extraction step S103 of FIG. 1. Background information and object information included in each frame $F'_i$ are separated. Detailed description for Step S301 that shows a scheme of extracting the object from the background is omitted.

Next, at step S303, an image binarization is performed on the object extracted from the background. As a result of step S303, a frame set of the binary image corresponding to the frame set S' is generated.

In accordance with the preferred embodiment of the present invention, the binarization step S303 is a pre-step to a later step of extracting a shape descriptor that uses information on a whole image pixel.

According to constitutional schemes of the object, shapes of the object are constituted in a single region or multiple regions. A shape descriptor that uses information about image shapes based on pixel data of the image region can be used as a descriptor that expresses a characteristic with respect to the object motion.

That is, in the method for extracting the static shape variation in accordance with the preferred embodiment, values $V_i(x, y)$ assigned to each pixel of all the binary images included in the binary image frame set are superimposed so as to generate a shape variation map (SVM) and the static shape variation extraction method is applied to the SVM.

In this case, $v_i(x,y)$ represents a value assigned to pixel coordinates of the binary image of the object corresponding to the frame $F'_i$, and x and y coordinates represent pixel coordinates of the binary image. With regardless of colored or black-and-white images, the object undergoes the binarization step S303 so to generate the binary image frame set in the pixel coordinates $V_i(x,y)$ corresponding to an inner silhouette of the object becomes 1 and pixel coordinates $V_i(x,y)$ corresponding to an outer silhouette of the object becomes 0.

Subsequent to the object extraction step S103, at step S105, a centroid of the object is shifted to that of the frame, in other words, the objects in each frame is aligned to the centroid of the frame. With respect to each frame constituting the binary image frame set, the reason for shifting the centroid of the object expressed as the binary images is to extract a characteristic of the object in the procedure of retrieving the image sequence data with regardless of information about positions of the object included in the frame.

Then, at step S107, all aligned objects of the binary image frame set are superimposed on one frame so as to generate the SVM. In other words, the SVM is one frame constituted of pixels superimposed with the values assigned to the pixels corresponding to each frame of the binary image frame set, meaning for a two-dimensional histogram.

Figure 4:
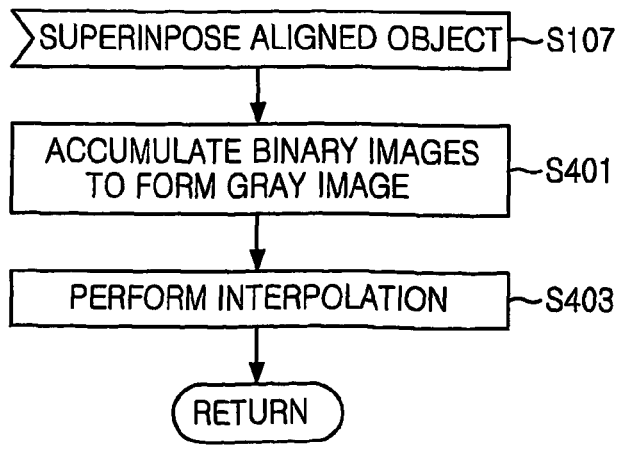
FIG. 4 is a flowchart, illustrating an object superposition procedure of FIG. 1.

As shown in FIG. 4, since the binary image frame set generated from the object extraction step S103 is assigned with the values of 1 or 0 to all pixels for each frame, at step S401, the object is superimposed, and simultaneously the binary images are accumulated to form a gray image.

The accumulative value SVM(x,y) with respect to each pixel coordinate is expressed as the following equation 4.

$$SVM(x, y) = \sum_{i=1}^{M} V_i(x, y) \quad \text{Eq. (4)}$$

$$\text{where } \begin{cases} V_i(x, y) = 1, \text{ if } (x, y) \in \text{ object region} \\ V_i(x, y) = 1, \text{ others} \end{cases}$$

In other words, SVM(x,y) is the information that the SVM possesses, representing an accumulative value, i.e., information on values with respect to object motions and shapes.

For instance, if three frames that are assigned to an identical pixel point (x1, y1) with a value of 1, e.g., $V_1(x1,y1)(=1)$, $V_4(x1,y1)(=1)$, and $V_7(x1,y1)(=1)$ are superimposed, then the corresponding pixel point is assigned with a value of 3. Hence, in case that M is 7, a maximum accumulative value is 7 and an arbitrary pixel point can be assigned with at least one natural number from 0 to 7.

Next, at step S403, interpolation is performed to the accumulative values of the pixel points generated at the accumulative value assignment step S401 by transforming a range from 0 to M of the accumulative value into a predetermined range, e.g., [0,255] of a grayscale. Normalization performed through the interpolation is to obtain a gray level value in the same range with regardless of the number of the frames while retrieving the image sequence data.

However, it is apparent for those skilled in the art that the grayscale applied to the interpolation procedure at S403 can be arbitrarily adjusted. Therefore, it should be understood that the interpolation is not limitedly applied solely to the 256 steps of the grayscale. For example, even though M is an arbitrary number, the above equation 4 is changed as the below equation 5 and the range of the grayscale becomes [0,1].

$$SVM(x, y) = \frac{1}{M}\sum_{i=1}^{M} V_i(x, y) \quad \text{Eq. (5)}$$

$$\text{where } \begin{cases} V_i(x, y) = 1, \text{ if } (x, y) \in \text{ object region} \\ V_i(x, y) = 1, \text{ others} \end{cases}$$

Figure 7A:
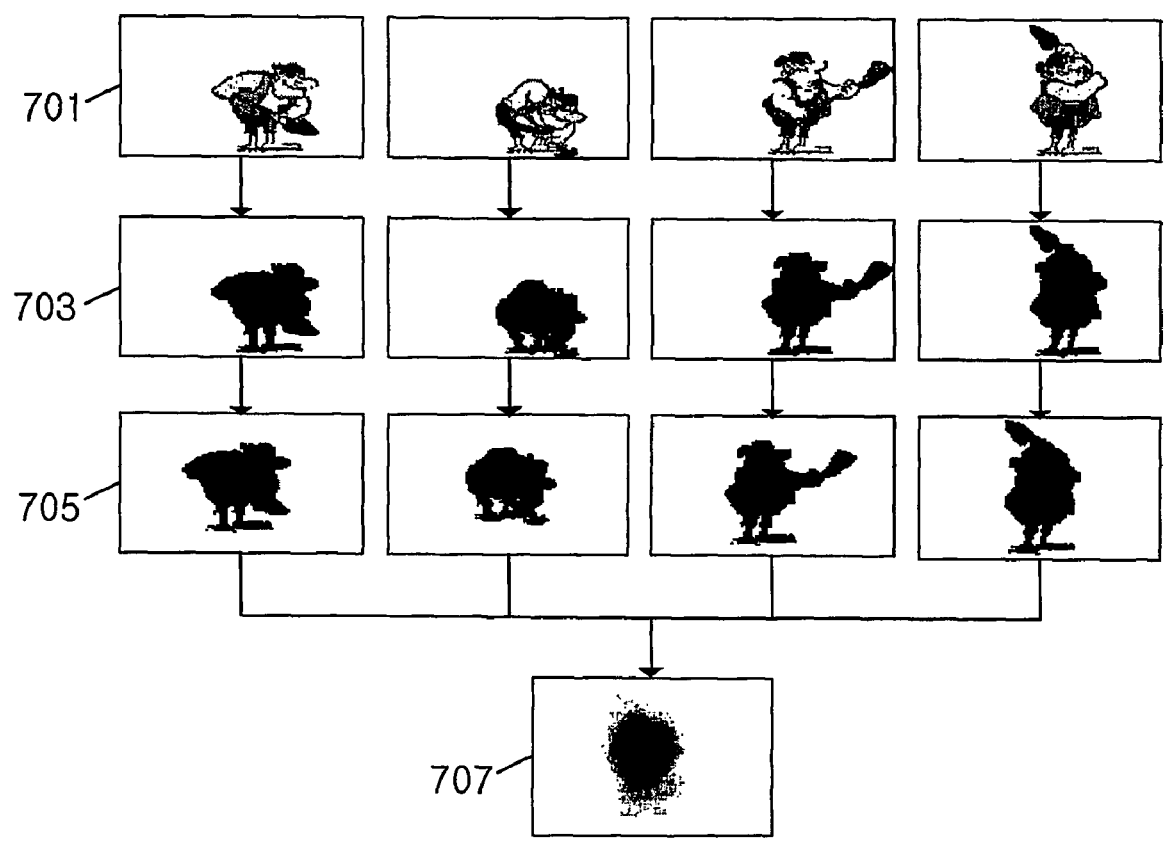

FIGS. 7A and 7B are exemplary diagrams illustrating a procedure for superposing objects separated from backgrounds in accordance with the preferred embodiment of the present invention.

In FIG. 7A, the reference numeral 701 represents 4 frames $F'_i$(M=4) generated through the step S301 of separating the object from the background and it is evident that 4 frames are in a state that the object is separated from the background. The reference numeral 703 represents the binary image frame generated through the object binarization step S303. Particularly, the binary image frame shows that the inner silhouette of the object assigned with a value of 1 is expressed with a color of black and the outer silhouetted of the object assigned with a value of 0 is expressed with a color of white. However, those ordinary people skilled in the art will clearly apprehend that the appended drawing is expressed in the above manner for the sake of description. Therefore, it should be noted that the inner and outer silhouettes of the object are not necessarily expressed with only black and white, respectively. For instance, it is possible to express the inner and silhouettes of the object with white and black, respectively.

In the meantime, the reference numeral 705 denotes the frame of which centroid of the object in the binary image is shifted and aligned at a centroid of each frame. The reference numeral 707 shows the SVM, wherein each frame 705 is superimposed through an object superposition step S707. The SVM 707 is transformed into the grayscale of which accumulative value ranges from 0 to M(=4) and is assigned to each pixel point through the interpolation step S403.

In FIGS. 7B and 7C, the reference numerals 713 and 723 represent the binary image frame (M=6) generated through the object binarization step S303, and the reference numerals 717 and 727 represent the SVM after superposing the binary image frames 713 and 723. The SVM 717 and 727 have the accumulative value, which are assigned to each pixel point ranging from 0 to M(=6) and transformed into the grayscale.

Figure 5:
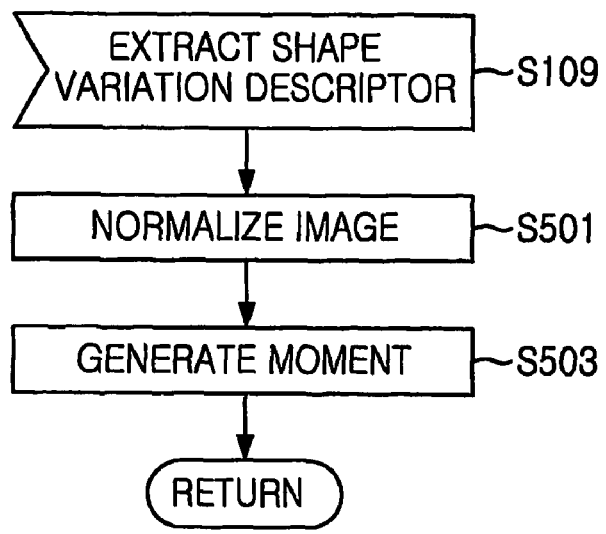
FIG. 5 is a flowchart, showing a descriptor extraction procedure of FIG. 1.

The object superposition step S107 is followed by a static shape variation extraction step S109. FIG. 5 is a flowchart showing a procedure for extracting the static shape variation of FIG. 1. In order to make retrieval possible with regardless of changes in the size of the object, the size of the SVM generated at the object superposition step S107 is normalized with a predetermined size, e.g., size of 80×80.

Then, at step S503, the static shape variation, which is a descriptor with respect to the shape variation, is extracted by applying a shape descriptor to the normalized SVM.

There is described in detail a method for extracting a characteristic about the shape variation of the image with applications of the Zernike moment and the angular radial transform (ART), which are another preferred embodiment of the shape variation descriptor.

I) Zernike Moment Extraction Procedure

The Zernike moment with respect to a function f(x,y) is a projection of the function f(x,y) with respect to the Zernike polynomial. That is, the Zernike moment is defined as the following equation 6.

$$Z_{nm} = \frac{n+1}{\pi} \int \int_u f(x, y) V_{nm}^*(x, y) dx dy \qquad \text{Eq. (6)}$$

The Zernike moment obtained from the above equation 5 is a complex number and only a magnitude of this complex number is taken to calculate the Zernike moment coefficient. Then, this magnitude is applied to a discrete function to obtain the Zernike moment as calculated by the following equation 7.

$$Z_{nm} = \frac{n+1}{\pi} \sum_\rho \sum_\theta f(\rho, \theta) r_{nm}(\rho) e^{-jm\theta} \qquad \text{Eq. (7)}$$

Herein, the Zernike complex polynomial $V_{nm}$ takes a format of the complex polynomial that completely makes a perpendicular cross at an internal side of a unit circle $U: x^2 + y^2 \leq 1$ in a polar coordinate system and the following equation 8 represent this case.

$$V_{nm}(x,y)|_{(x,y) \to (\rho,\theta)} = V_{nm}(\rho,\theta) = r_{nm}(\rho) e^{jm\theta}$$

n,m: integer, $n \geq 0$, $|m| \leq n$, $n-|m|$: integers that are even numbers $$\text{where, } r_{nm}(\rho) = \sum_{s=0}^{\frac{n-|m|}{2}} (-1)^s \frac{(n-s)!}{s! \left(\frac{n+|m|}{2} - s\right)! \left(\frac{n-|m|}{2} - s\right)!} \rho^{n-2s} \qquad \text{Eq. (8)}$$

FIGS. 10A to 10D shows the Zernike moment basis function $V_{nm}$. Particularly, FIGS. 10A and 10B, each expresses a real part and an imaginary part when m=2k, where k=a whole integer, while FIGS. 10C and 10D, each expresses a real part and an imaginary part when m≠2k, where k=a whole integer.

In case of an object rotated in an angle of a, the Zernike moment equation shown at the equation 8 can be expressed as the following equation 9.

$$Z_{nm}^r = \frac{n+1}{\pi} \sum_\rho \sum_\theta f(\rho, \theta - \alpha) r_{nm}(\rho) e^{-jm\theta} \qquad \text{Eq. (9)}$$

where, $Z_{nm}^r = Z_{nm} e^{-jm\alpha}$, $\|Z_{nm}^r\| = \|Z_{nm}\|$

The Zernike moment of the rotated object as shown in the equation 9 changes its phase only, resulting in the same absolute value of the Zernike moment. With use of this property, the static shape variation with respect to the rotation of the object can be described.

II) Angular Radial Transform (ART) Descriptor Extraction Procedure

Angular radial transform (ART) is an orthogonal unitary transform constituted with a sinusoidal function at a unit circle as a basis and is able to describe the static shape that is not changed even with the rotation. Also, because of the orthogonality, there is no overlapping of information. The ART is defined as the following equation 10.

$$F_{nm} = <V_{nm}(\rho, \theta), f(\rho, \theta)> \qquad \text{Eq. (10)}$$

$$= \int_0^{2\pi} \int_0^1 V_{nm}^*(\rho, \theta), f(\rho, \theta) \rho d\rho d\theta$$

In this case, $F_{nm}$ is a complex number in n and mth order of a coefficient of the ART, and takes only a magnitude of this coefficient to obtain a characteristic of the image. However, the value, when n=0 and m=0, is not used as a descriptor but is used to normalize each coefficient. $f(\rho,\theta)$ is an image function of the polar coordinate system, and $V_{nm}(\rho,\theta)$ is a basis function that can be expressed with a multiply of a function of a circumferential direction and that of a semi-circumferential direction. The following equation 11 depicts the above mentioned $V_{nm}(\rho,\theta)$.

$$V_{nm}(\rho,\theta) = A_m(\theta) R_n(\rho) \qquad \text{Eq. (11)}$$

Herein, $A_m(\theta)$ and $R_n(\rho)$ represent an angular and a radial functions, respectively, and both $A_m(\theta)$ and $R_n(\rho)$ constitute the ART basis function. $A_m(\theta)$ should be expressed as the following equation 12 to exhibit the static property even with the rotation.

$$A_m(\theta) = \frac{1}{2\pi} e^{jm\theta} \qquad \text{Eq. (12)}$$

That is, in case that $A_m(\theta)$ uses a cosine function and a sine function as the radial basis function, each function is expressed as ART-C and ART-S, respectively.

$R_n(\rho)$ of the equation 10 can have various types and ART-C can be denoted as the following equation 13.

$$ART\text{-}C: R_n^c(\rho) = \begin{cases} 1, n = 0 \\ 2\cos(\pi n \rho), n \neq 0 \end{cases} \qquad \text{Eq. (13)}$$

Figure 9A:
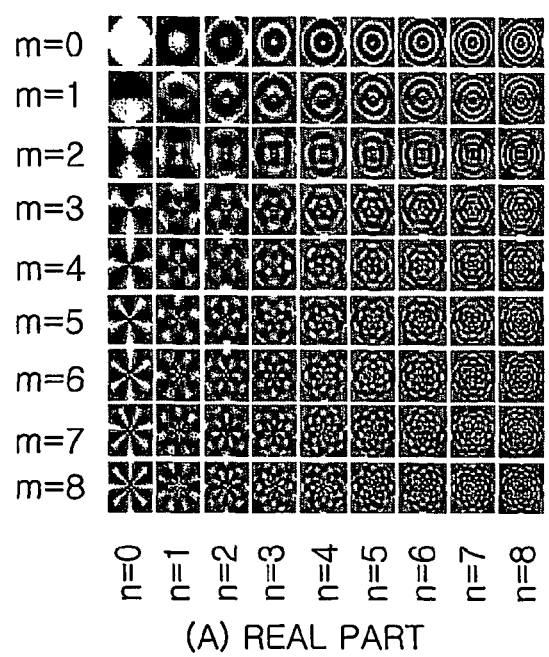
FIGS. 9A and 9B are graphs representing an angular radial transform (ART) basis function as a preferred embodiment of the present invention.
Figure 9A:
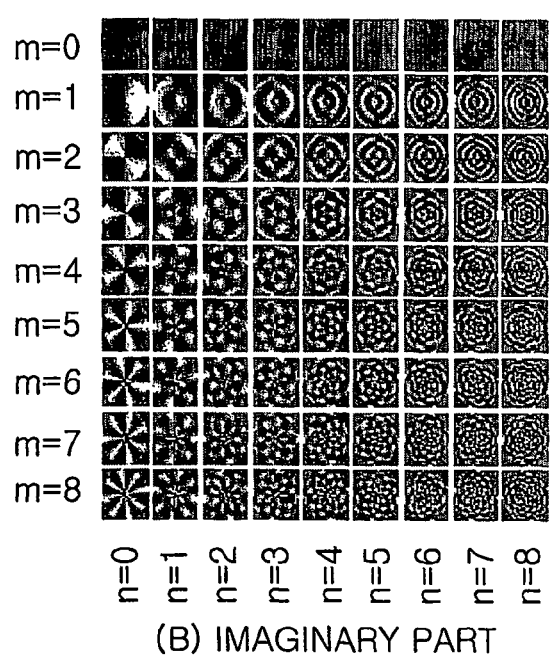
Figure 9B:
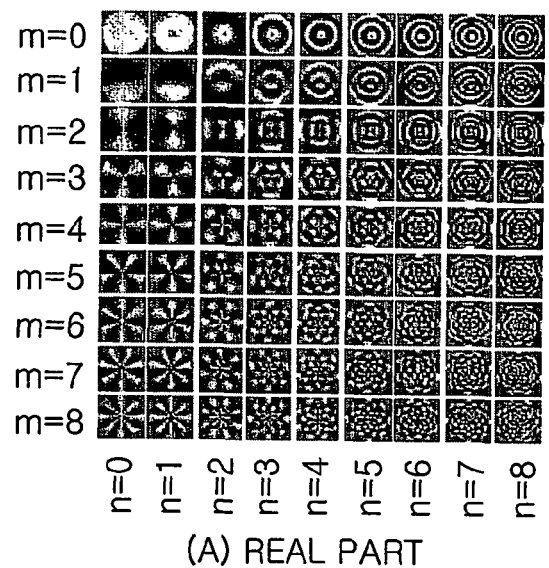
Figure 9B:
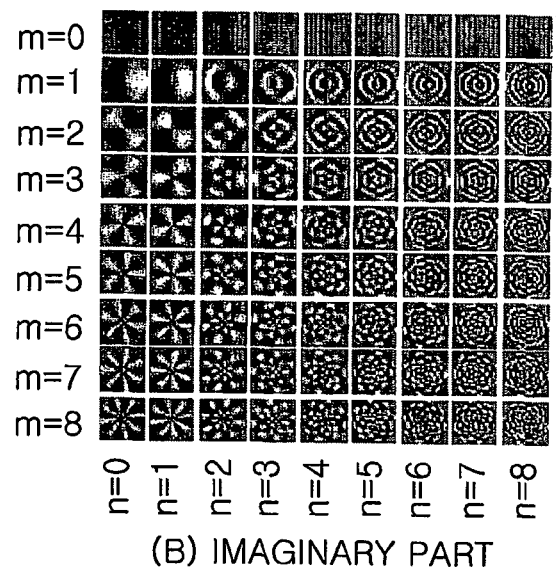
Figure 10A:
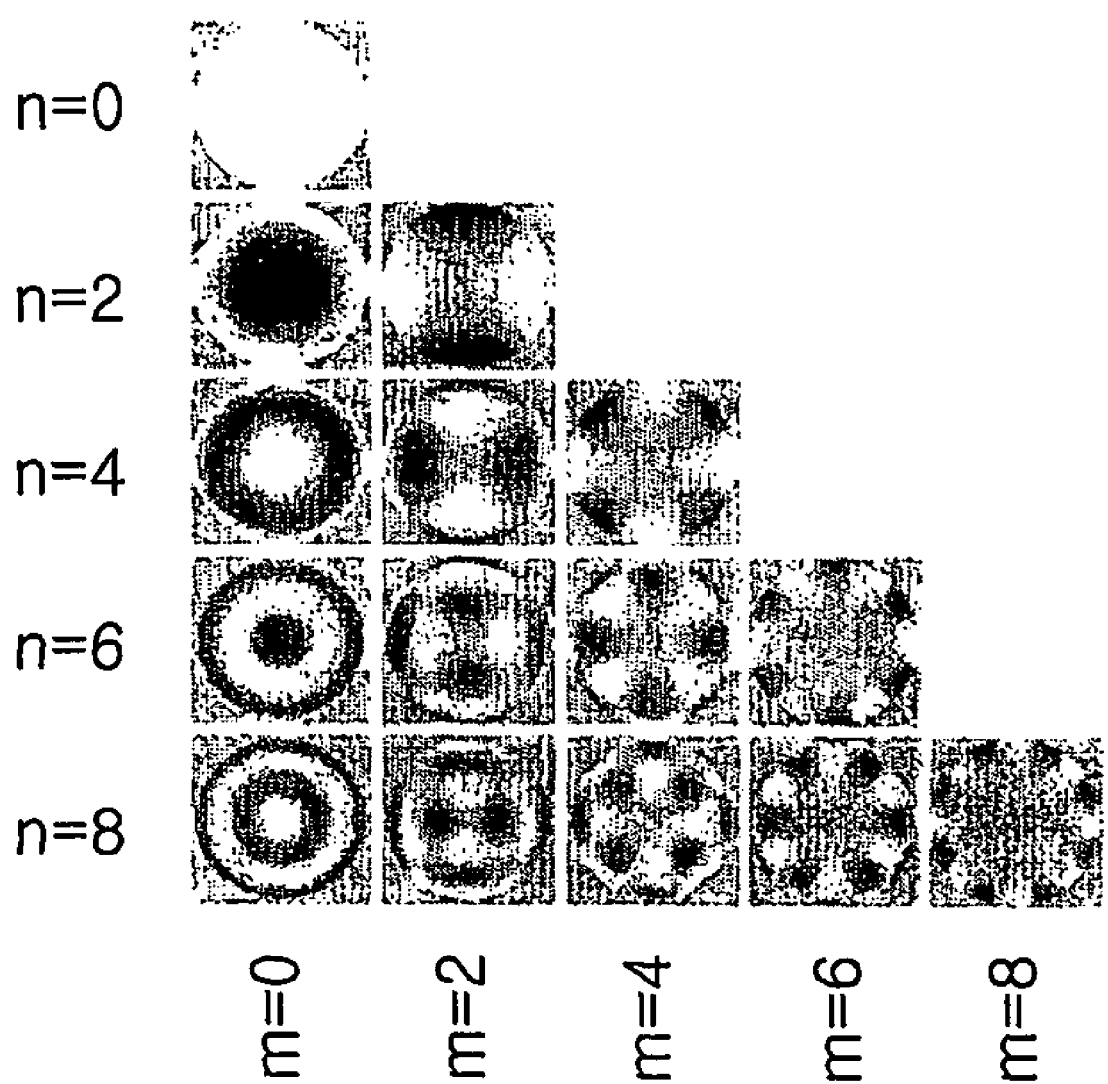
FIGS. 10A to 10D are graphs representing a Zernike moment basis equation as a preferred embodiment of the present invention.
Figure 10B:
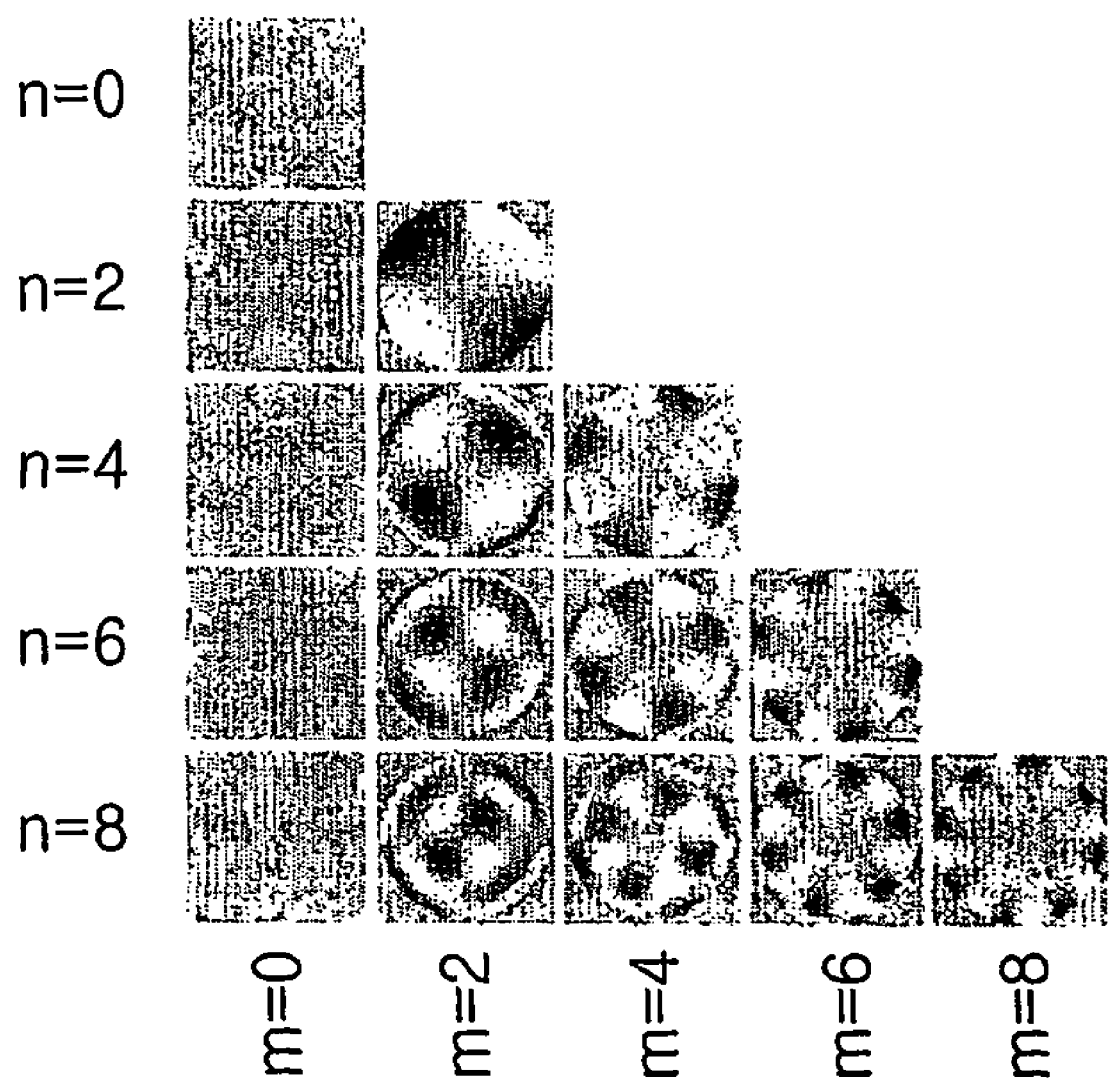
Figure 10C:
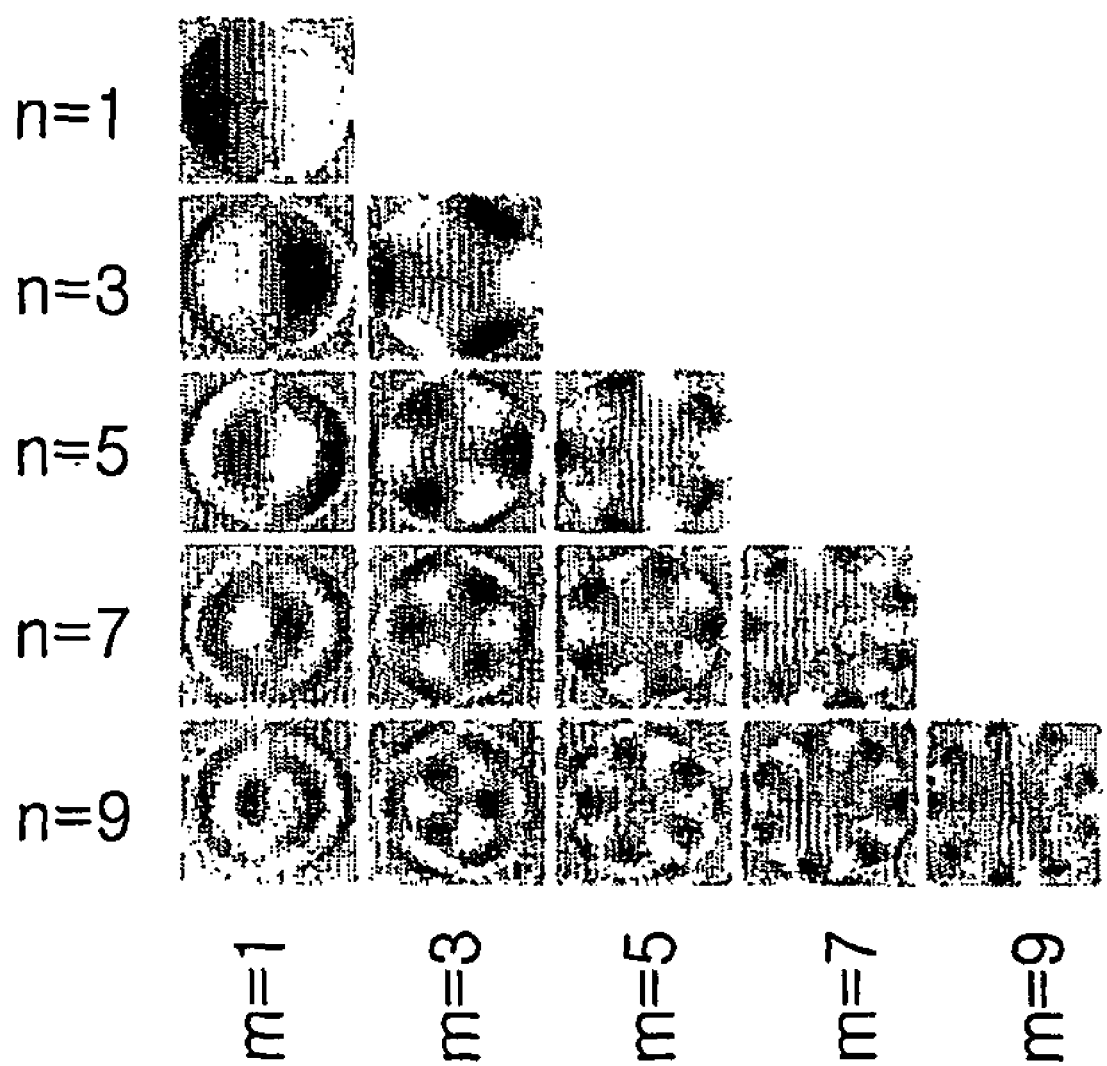
Figure 10D:
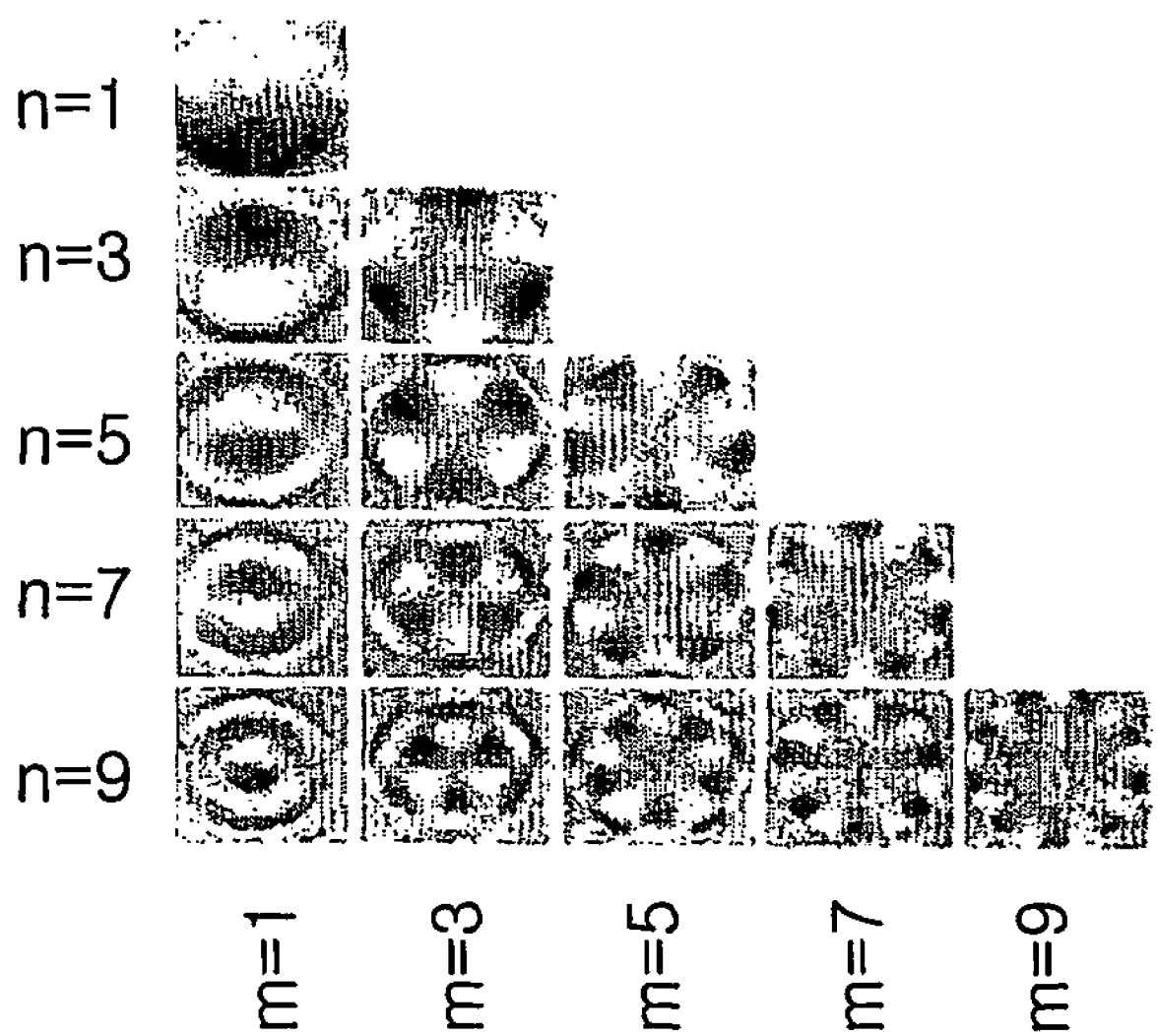

The ART coefficient extracted from the image expresses a ratio of the ART basis function characteristic included in the circular image, and thus, it is possible to restore the circular image through a combination of a multiply between the ART coefficient and the ART basis function. Theoretically, enormous plural numbers of the multiply of the ART coefficient and the basis function should undergo the combination to obtain a completely identical image. However, as shown in the FIGS. 9A and 9B, the combinations of the multiply in a range from 20 to 30 still provides a nearly non-erroneous image compared to the original one.

In addition, an absolute value of the ART coefficient calculated from the equation 9 exhibits rotation invariance as clearly demonstrated in the following equation 14.

$$f^\alpha(\rho,\theta)=f(\rho,\alpha+\theta) \quad \text{Eq. (14)}$$

Also, a relationship between the ART coefficients extracted from the original image $f(\rho,\theta)$ and the rotated image with an angle of $\alpha$ $f^\alpha(\rho,\theta)$ is represented in the following equation 15.

$$F_{nm}^\alpha = F_{nm} e^{jm\alpha} \quad \text{Eq. (15)}$$

However, if the absolute value is applied to the rotated image $F_{nm}^\alpha$, then it becomes identical as the original image $F_{nm}$. Hence, a magnitude of the ART possesses the rotation invariance characteristic. The following equation 16 demonstrates the above case.

$$\|F_{nm}^\alpha\| = \|F_{nm}\| \quad \text{Eq. (16)}$$

As another preferred embodiment, there is explained a procedure for calculating the ART coefficient when an angular order and a radial order of the SVM are 9 and 4, respectively. In accordance with the preferred embodiment, the static shape variation has the normalized and quantized magnitude of the ART coefficient extracted from the SVM and is assumed to be an arrangement with the magnitude of 35 as the following: static shape variation=static shape variation [k],k=0, 1, . . . 34. Values for each bin of the histogram correspond to frequency, which means how the object appears frequently at the pixel site of the whole image sequence. The maximum value of the bin means that a part of the object always appears at the corresponding pixel site or it is static through the whole image sequence. As the value of the pixel is higher, a degree of the object being static at the pixel point becomes higher as well. The following Table 1 shows a relationship between an order of K, a radial order and an angular order (n, m).

TABLE 1

| | | | | | | | k | | | | |
|---|---|---|---|---|---|---|---|---|---|---|---|
| | 0 | 1 | 2 | 3 | 4 | 5 | 6 | ... | 31 | 32 | 33 | 34 |
| n | 1 | 2 | 3 | 0 | 1 | 2 | 3 | ... | 0 | 1 | 2 | 3 |
| m | 0 | 0 | 0 | 1 | 1 | 1 | 1 | ... | 8 | 8 | 8 | 8 | i) Basis Function Generation:

The ART complex basis function including the real part function BasisR[9][4][LUT_SIZE][LUT_SIZE] and the imaginary part function BasisI[9][4][LUT_SIZE][LUT_SIZE] is generated through the following codes:

```
cx=cy=LUT_SIZE/2; //center of the basis function
for(y=0; y<LUT_SIZE; y++)
 for(x=0; x<LUT_SIZE; x++){
    radius=sqrt((x-cx)*(x-cx)+(y-cy)*(y-cy));
    angle=atan2(y-cy, x-cx);
    for(m=0; m<9; m++)
     for(n=0; n<4; n++){
        temp=cos(radius * π * n/(LUT_SIZE/2));
        BasisR[m][n][x][y]=temp*cos(angle*m);
        BasisI[m][n][x][y]=temp*sin(angle*m);
     }
 }
```

In this case, LUT_SIZE means for the size of a look-up table and conventionally, the LUT_SIZE is 101.

ii) Size Normalization:

The centroid aligned at the SVM is arrayed to correspond to the centroid of the look-up table. In case that the size of the image and that of the look-up table are different from each other, linear interpolation is then employed to make the corresponding image mapped into the corresponding look-up table. In this case, the size of the object is defined to be twice of a maximum distance from the centroid of the object.

iii) ART Transformation:

A raster scan order is used to summate multiplied pixel values of the SVM in which each pixel corresponds to the look-up table so that the real and imaginary parts of the ART coefficient are calculated.

iv) Region Normalization:

Magnitudes of each ART coefficient are calculated and divided by the number of pixels of object regions.

v) Quantization

In accordance with the preferred embodiment, the static shape variation[k](k=0, 1, . . . 34) is obtained through a step wherein the ART coefficient is nonlinearly quantized into 16 steps according to the provided Table 1 in below so as to be expressed in 4 bits.

TABLE 2

| Range | Quantization Index |
|---|---|
| 0.000000000 ≦ value < 0.003073263 | 0000 |
| 0.003073263 ≦ value < 0.006358638 | 0001 |
| 0.006358638 ≦ value < 0.009887589 | 0010 |
| 0.009887589 ≦ value < 0.013699146 | 0011 |
| 0.013699146 ≦ value < 0.017842545 | 0100 |
| 0.017842545 ≦ value < 0.022381125 | 0101 |
| 0.022381125 ≦ value < 0.027398293 | 0110 |
| 0.027398293 ≦ value < 0.033007009 | 0111 |
| 0.033007009 ≦ value < 0.039365646 | 1000 |
| 0.039365646 ≦ value < 0.046706155 | 1001 |
| 0.046701655 ≦ value < 0.055388134 | 1010 |
| 0.055388134 ≦ value < 0.066014017 | 1011 |
| 0.066014017 ≦ value < 0.079713163 | 1100 |
| 0.079713163 ≦ value < 0.099021026 | 1101 |
| 0.099021026 ≦ value < 0.132028034 | 1110 |
| 0.132028034 ≦ value | 1111 |

According to the following Table 3, the quantized ART coefficient is inversely quantized at a similarity distance calculation procedure for estimating similarity in later steps.

TABLE 3

| Quantization Index | Inversed value |
|---|---|
| 0000 | 0.001511843 |
| 0001 | 0.004687623 |
| 0010 | 0.008090430 |
| 0011 | 0.011755242 |
| 0100 | 0.015725795 |
| 0101 | 0.020057784 |
| 0110 | 0.024823663 |
| 0111 | 0.030120122 |
| 1000 | 0.036080271 |

TABLE 3-continued

| Quantization Index | Inversed value |
|---|---|
| 1001 | 0.042894597 |
| 1010 | 0.050849554 |
| 1011 | 0.060405301 |
| 1100 | 0.072372655 |
| 1101 | 0.088395142 |
| 1110 | 0.112720172 |
| 1111 | 0.165035042 |

The characteristic with respect to motions of the object itself is extracted through the static shape variation extraction method in accordance with the preferred embodiment of the present invention, and the static shape variation is calculated from a course of procedures for establishing the image sequence database so as to improve retrieval function with respect to the image sequence data. That is, it is possible for a user to retrieve specific image sequence data from enormous amounts of the image sequence data established.

Figure 6:
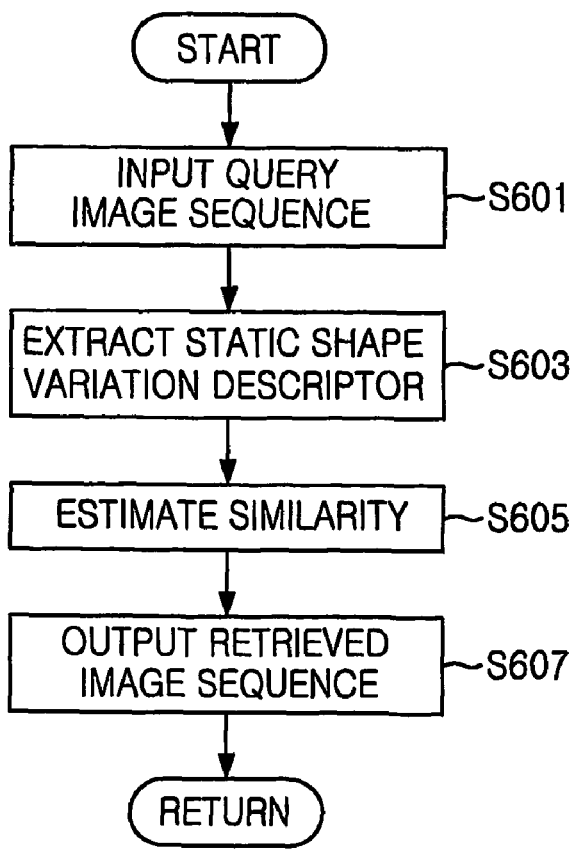
FIG. 6 is a flowchart showing a procedure for retrieving image sequences in accordance with the preferred embodiment of the present invention.

FIG. 6 is a flowchart showing a procedure for retrieving the image sequence in accordance with the preferred embodiment of the present invention. At step S601, an image sequence retrieval system that employs the static shape variation extraction method receives query image sequence data inputted by a user. Then, at step S603, the static shape variation is extracted in accordance with the static shape variation extraction method described in FIGS. 1 to 5. After this extraction, at step S605, a similarity distance between the extracted static shape variation and the image sequence data established in the image sequence database is estimated.

There is described a preferred embodiment of a similarity retrieval method used in cases of applying the Zernike moment and the angular radial transform (ART). Also, it will be apparent for those skilled in the art that this similarity retrieval method described in accordance with the present invention can be applicable for other diverse retrieval methods other than the similarity estimation. For example, a general equation for the similarity estimation can be expressed as the following.

$$D_{ssv}(Q, D) = \sum_{i=0}^{k} \left| \begin{array}{c} InverseQuantize(StaticShpaeVariation)_Q[i]) - \\ inverseQuantize(StaticShapeVariation)_D[i]) \end{array} \right| \quad \text{Eq. (17)}$$

In this case, the subscript Q represents the query image sequence while the subscript D represents the image sequence stored previously.

The similarity distance between two static shape variations with respect to the query image sequence and the previously stored image sequence is expressed as the following equation 18.

$$D_{ssv}(Q, D) = \sum_{i} \| M_{ssv,Q}[i] - M_{ssv,D}[i] \| \quad \text{Eq. (18)}$$

In this case, $M_{ssv,Q}[i]$ is an ith characteristic StaticShapeVariation[i] of the query image sequence, whereas $M_{ssv,D}[i]$ is an ith characteristic StaticShapeVariation[i] of the comparative image sequence stored into the image sequence database.

The equation provided in below exhibits a dissimilarity between the query image sequence and the image sequence database. That is, the descriptors extracted from similar images have similar values and different images give a rise to descriptors having completely different values. Hence, it is possible to determine a similarity between two images by comparing the descriptors extracted from two images as shown from the equation 19 in below.

$$D = \sum_{i} W_i \times \| S_i^Q - S_i^D \| \quad \text{Eq. (19)}$$

Herein, the reference symbols, D, $W_i$, $S_i^Q$, $S_i^D$ represent a dissimilarity between the query image and the database image, a constant coefficient, an ith query image descriptor, and an ith image descriptor of the database image, respectively. After estimating the similarity at step S605, the image sequence data with the highest similarity are selected at step S607.

Figure 8A:
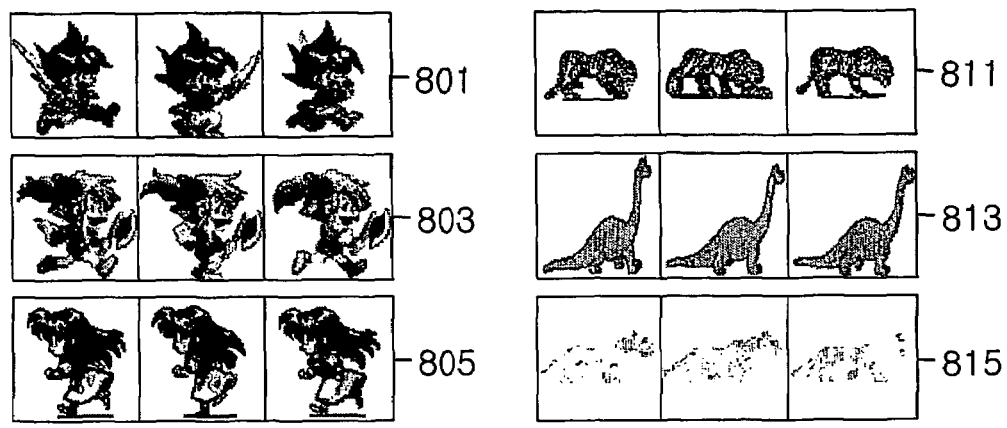
FIGS. 8A and 8B are image sequence diagrams for describing an exemplary retrieval in accordance with the preferred embodiment of the present invention.
Figure 8B:
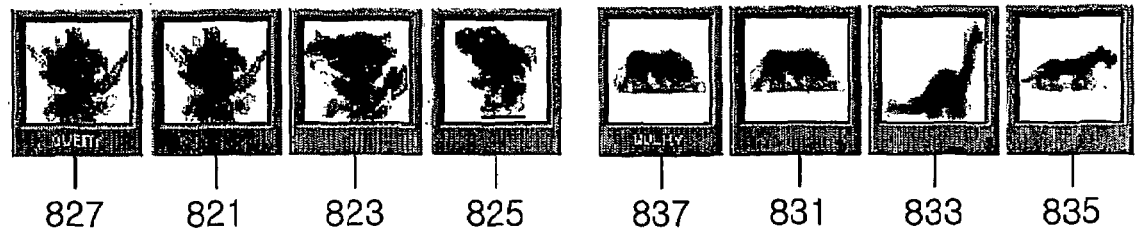

FIGS. 8A and 8B are diagrams showing image sequences to describe an exemplary retrieval in accordance with the preferred embodiment of the present invention. The reference numerals from 801 to 815 represent image sequence data each established with 3 frames M=3 and exhibit an animation GIF image frame set. As illustrated in FIG. 9, if images are sparsely changed between nearly located frames Fi in the frame set S, it is possible to construct another frame set S' by regulating the period T although N is still large. Also, in case that lots of binary image object frames are superimposed at the object superposition step S107, the shape of the superimposed object image at the SVM becomes blurred, and thus, as described above, a predetermined number of frames, e.g., 10 frames M=10 can be selected by regulating the period T.

FIG. 8B is an exemplary diagram showing a result of the image sequence data retrieval in accordance with the preferred embodiment of the present invention. As illustrated in FIG. 8B, the retrieval results are exhibited when the image sequence data 801 and 811 of FIG. 8A is retrieved under the query image sequence data 827 and 837, respectively.

The reference numerals 821, 823 and 825 appear as results of the image sequence data, and the SVM corresponding to image sequence data 801, 803 and 805 of FIG. 8A, respectively. Also, the reference numerals 831, 833 and 835 are the SVM corresponding to the image sequence data 811, 813 and 815 in FIG. 8A. The SVM 821 and 831, shown next to the query image sequence data 827 and 837, have the highest level of the similarity estimation with the query image sequence data 827 and 837 based on the static shape variation. The SVM, 823, 825, 833, and 835, arranged on a right side of the query image sequence data 827 and 837 mean that they have relatively lower levels of the similarity estimation. These retrieval results are in a high confidence as can be seen from FIG. 9B.

Figure 11:
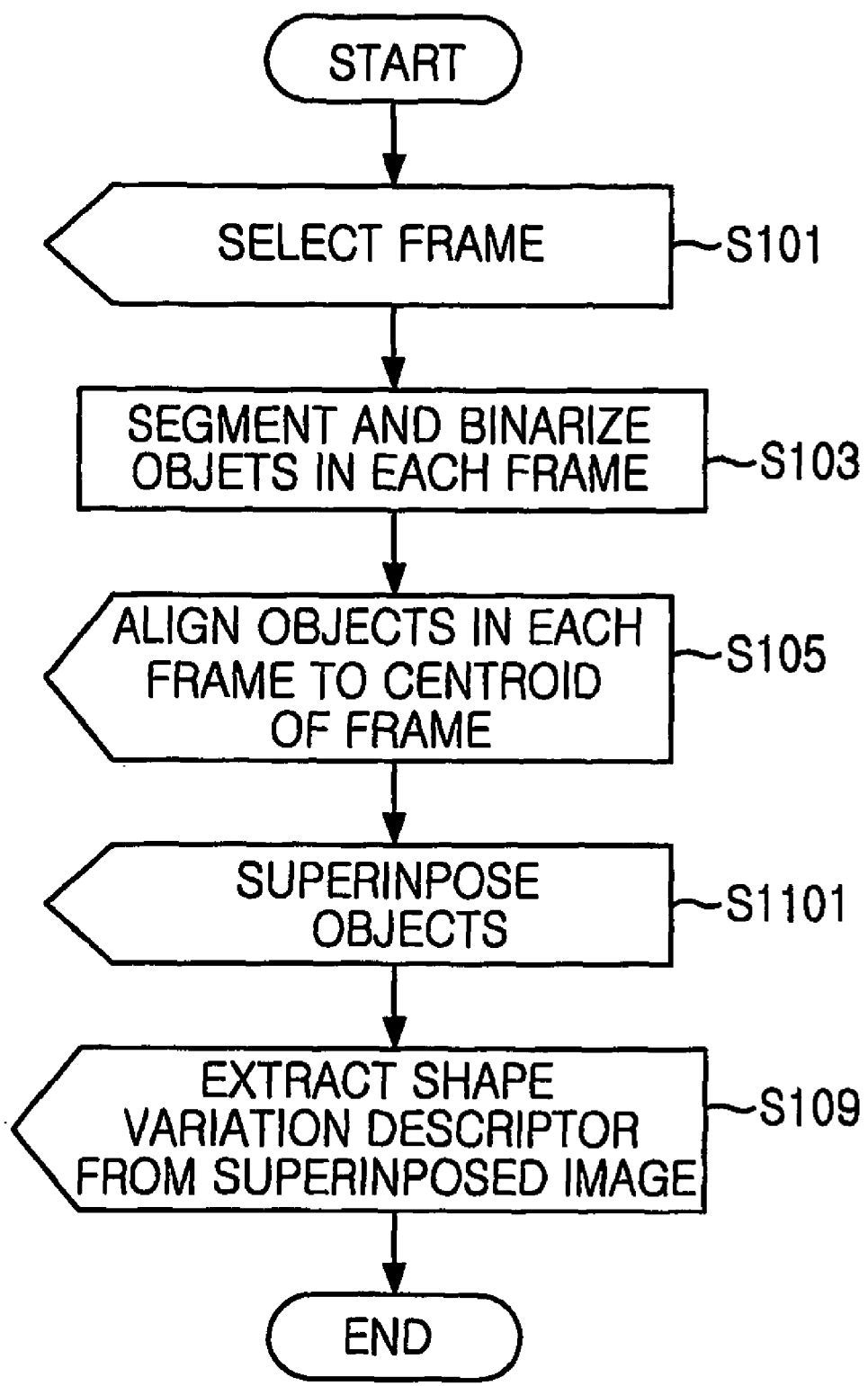
FIG. 11 is a flowchart depicting a procedure for extracting a dynamic shape variation descriptor in accordance with the preferred embodiment of the present invention.

FIG. 11 is a flowchart showing a procedure for extracting a dynamic shape variation descriptor in accordance with another preferred embodiment of the present invention. As illustrated in FIG. 11, the dynamic shape variation extraction procedure is similar to the static shape variation extraction procedure described in FIG. 1, except for an object superposition procedure S1101.

Therefore, the static shape variation is extracted as a shape variation descriptor at the static shape variation procedure S109 as described in FIG. 1, whereas the dynamic shape variation is extracted instead at step S109 because of the pre-step S1101 as shown in FIG. 11.

Figure 12:
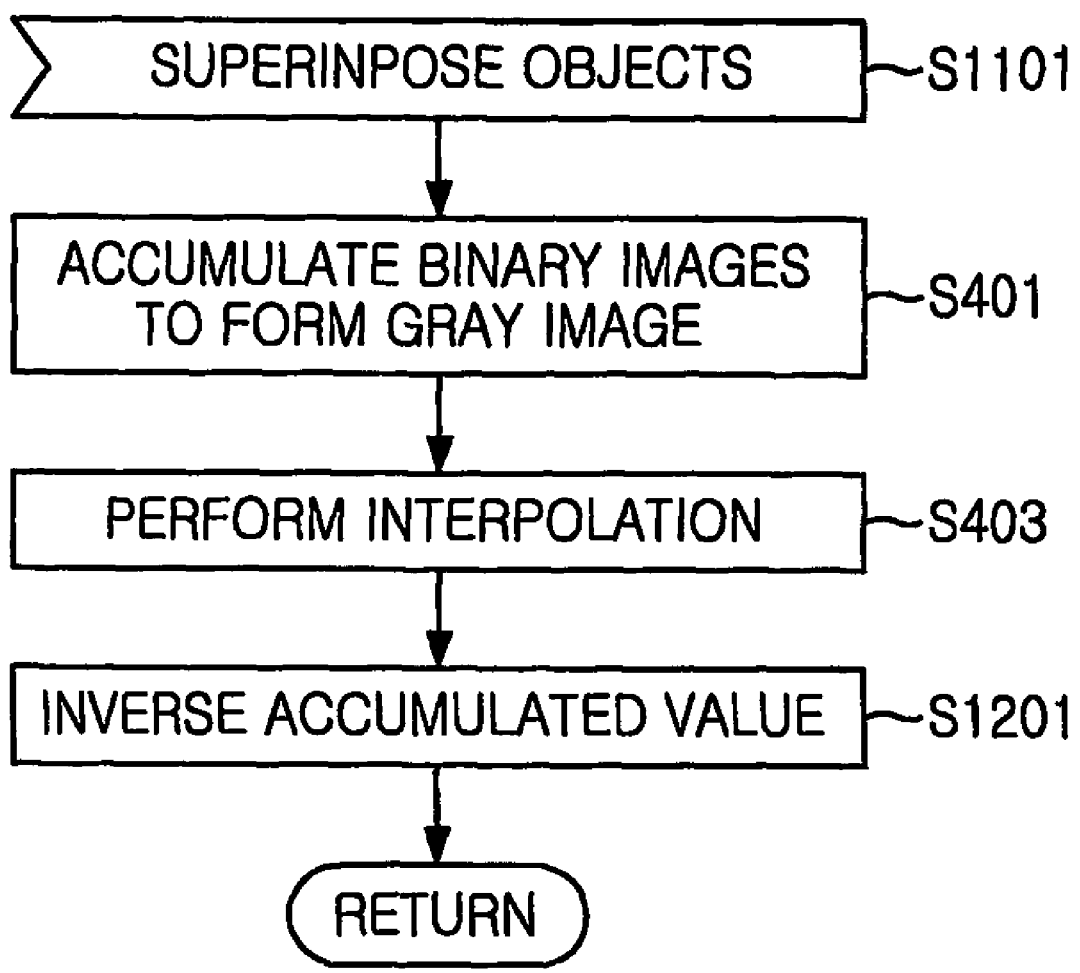
FIG. 12 is a flowchart representing an object superposition procedure of FIG. 11.

FIG. 12 is a flowchart depicting the object superposition procedure of FIG. 11. Steps shown in FIG. 12 are also similar to those in FIG. 4. That is, the SVM is generated by procedures from S101 to S403. In addition, the dynamic shape variation extraction procedure in accordance with another preferred embodiment has an additional step S1201 wherein accumulative values assigned to each pixel of the object part except for the background of the SVM are inversed.

The above step S1201 is performed in accordance with the following equation 20.

$$NSVM(x, y) = \begin{cases} GS - SVM(x, y), & \text{if } SVM(x, y) \neq 0 \\ 0, & \text{others} \end{cases} \quad \text{Eq. (20)}$$

In this case, the SVM is assumed to be normalized with the grayscale [0,GS], and GS represent an arbitrary number. For instance, during the procedures for generating the SMV, GS equals to 1 in case that the interpolation is performed at step S403 with the grayscale of [0,1].

Figure 13:
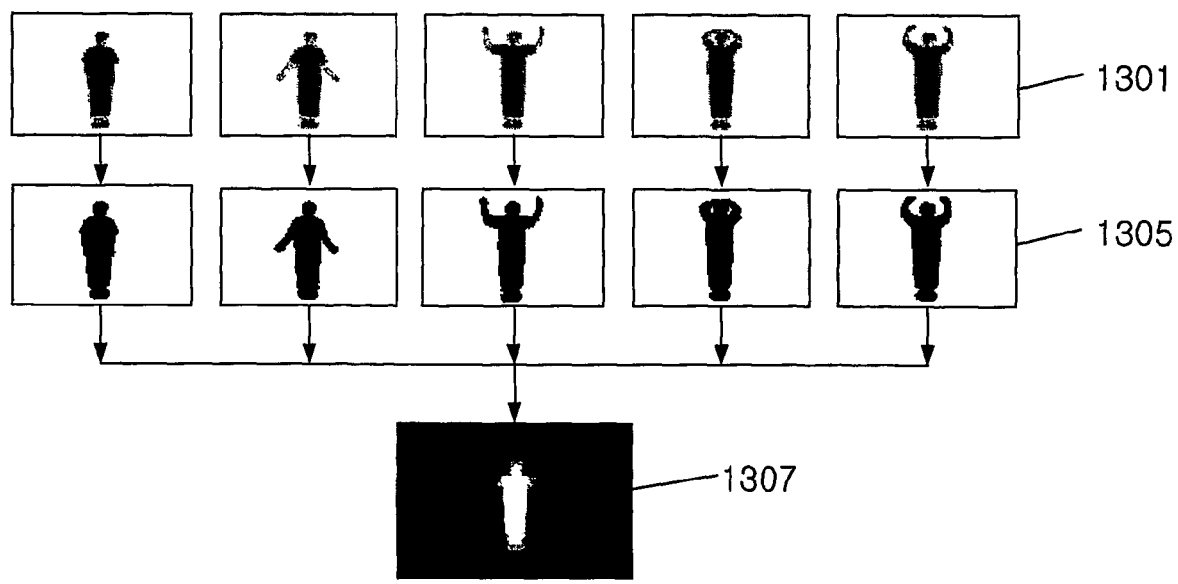
FIG. 13 is a diagram for explaining a shape variation map (SVM) generation procedure.

FIG. 13 is a diagram explaining the procedures for generating the SVM. The SVM generation procedure depicted in FIG. 13 is the same SVM generation procedure described in FIGS. 7A to 7C. That is, the reference numeral 1301 expresses 5 frames $F_i'$ where M=5 that are generated through step S301 and shows that the object is separated and subsequently extracted from the background. The reference numeral 1305 represents a binary image frame generated through the object binarization step S303 and the shift of the centroid of the object step S105. Especially, the inner silhouette of the object expressed as 1 is assigned with black while the outer silhouette of the object expressed as 0 is assigned with white.

The reference numeral 1307 represents the SVM generated by superposing each frame 1305. In the SVM 1307, accumulative values, where M=5 and ranges from 0 to M, are assigned to each pixel point and transformed into the grayscale through step S403. In this case, the SVM 1307 in FIG. 13 can be interpreted identically as the SVM 707, 717, 727 in FIGS. 7A to 7C; however, the SVM 1307 is expressed in an inversed state in the drawing only so as to distinguish remarkably the difference from the NSVM which will be described in the later section.

Figure 15:
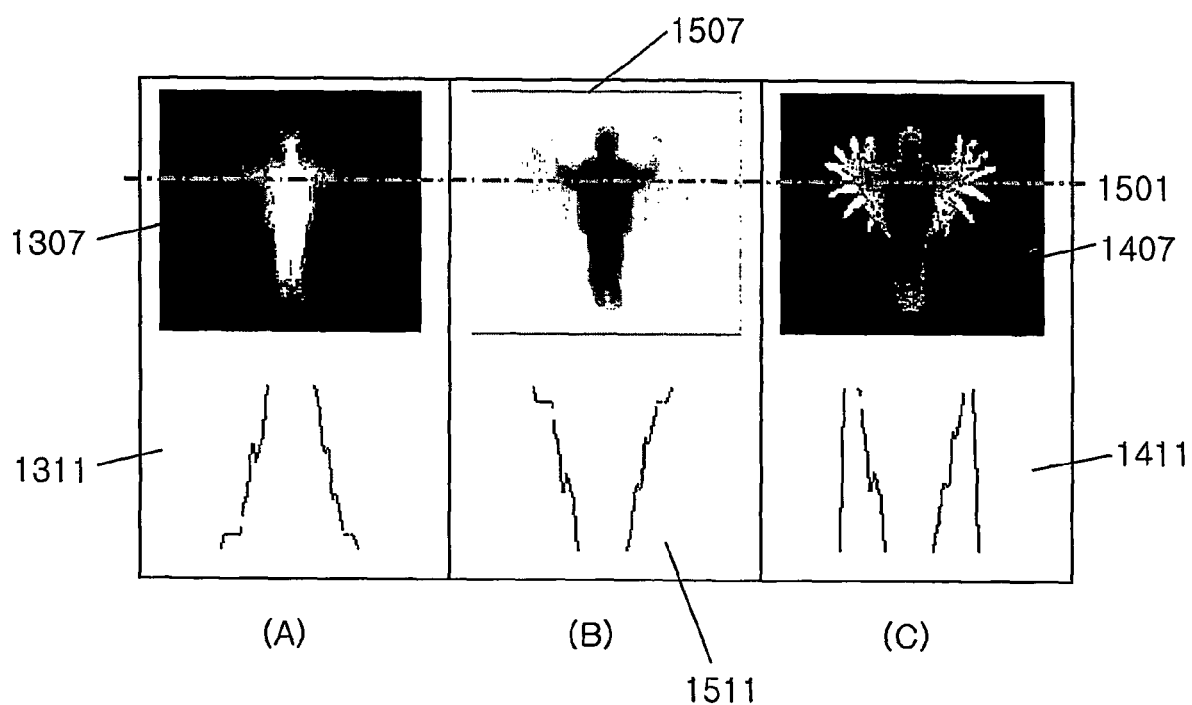

FIGS. 14A, 14B and 15 are diagrams describing the difference between the SVM and the NSVM. The reference numerals 1307 and 1309 are the SVM generated from the image sequence expressing motions of each different object. The reference numerals 1407 and 1409 are the NSVM generated through another preferred embodiment with respect to the SVM 1307 and 1309 as described in FIGS. 11 and 12. Comparing the SVM, 1307 and 1309 with the NSVM, 1407 and 1409, values assigned to each pixel constituting the object part are inversed according to the above equation 18. However, it should be noted that the values assigned to each pixel constituting the background part are not inversed. The reference numeral 1507 is a frame that appears when a whole frame of the SVM 1307 is inversed and is different from the NSVM 1407. In other words, the reference numerals 1311 and 1411 are graphs that represent accumulative values assigned to each pixel of the SVM 1307 and the NSVM 1407 at a base line 1501. In particular, the pixel values constituting the object part are inversed whereas the pixel values constituting the background are not inversed. In the meantime, a graph 1511 represents pixel values with respect to the frame 1507 which are different from the accumulative values 1411 of the NSVM 1407.

As described above from FIG. 1 to FIG. 10D, the static shape variation extraction procedure and the image sequence retrieval procedure in accordance with the static shape variation, are identically applied to the dynamic shape variation extraction procedure and the image sequence retrieval procedure in accordance with the dynamic shape variation, except for a fact that the dynamic shape variation is extracted in accordance with the NSVM generation procedure described in FIGS. 11 to 15 at step S109 because of the pre-step S1101. The general equation for retrieving a degree of the similarity according to the dynamic shape variation is adjusted as the following.

$$D_{ssv}(Q, D) = \sum_{i=0}^{k} \left| InverseQuantize(DynamicShapeVariation)_Q[i]) - InverseQuantize(DynamicShapeVariation)_D[i]) \right| \quad \text{Eq. (21)}$$

Herein, the subscript Q and D represent the query image sequence and the image sequence previously stored into the database, respectively.

By following a further preferred embodiment of the present invention, it is possible to improve efficiency in retrieval of the image sequence through the use of the shape variation descriptor. That is, instead of employing the static shape variation and the dynamic shape variation as a characteristic with respect to the image sequence, a predetermined weight is applied to the static shape variation and the dynamic shape variation, and then, the calculated arithmetic average value is determined to be a new characteristic of the corresponding image sequence so as to estimate the similarity within the video database based on the extracted characteristic, thereby retrieving the image sequence data that a user wishes to retrieve.

The following is the general equation for retrieving a similarity.

$$\text{Distance}(Q,D) = \alpha D_{ssv}(Q,D) + \beta D_{DSV}(Q,D) \quad \text{Eq. (22)}$$

where, $\alpha, \beta$: weight

The following is a trial test performed on retrieval efficiency in accordance with the above-preferred embodiment of the present invention.

A data set used for the trial test is constituted of 80 groups and 800 data suggested in a course of moving picture expert group-7 (MPEG-7) standardization procedures. As can be seen from Table 4 in below, the data set with 80 groups can be divided into 20 groups with 200 data wherein 20 clips from 10 people are simulated, 50 groups with 500 data wherein 50 clips are simulated in three-dimensional animation and 10 groups with 100 data wherein moving characters are expressed.

TABLE 4

| Data Set | Number of groups | Number of clips |
| --- | --- | --- |
| Animation | 60 | 600 |
| Video | 20 | 200 |

Based on Table 4, the retrieval efficiency in cases of using the SVM, i.e., static shape variation, the NSVM, i.e., dynamic shape variation and summations of the SVM and the NSVM with a particular weight are compared with each other. Based on the above conditions, trial tests are performed with respect to the following 4 cases:

Case 1 wherein only SVM, i.e., static shape variation is applied;

Case 2 wherein only NSVM, i.e., dynamic shape variation is applied;

Case 3 wherein the SVM, i.e., static shape variation and the NSVM, i.e., dynamic shape variation are applied in a ratio of 5:5; and Case 4: the SVM, i.e., static shape variation and the NSVM, i.e., dynamic shape variation are applied in a ratio of 3:7.

ANMRR (Kim, Whoi-Yul & Suh, Chang-Duck. (June, 2000) "A new metric to measure the retrieval effectiveness for evaluating rank-base retrieval systems". *Journal of Broadcasting Engineering* 5 (1), 68–81., published by Korean Society of Broadcast Engineers) is used as an evaluation scale for a quantitative analysis for retrieval effectiveness. The ANMRR scale ranges from 0 to 1, and the retrieval effectiveness increases as the ANMRR value becomes smaller. The following Table 5 shows average values of the measured ANMRR with respect to each group listed in Table 5.

TABLE 5

| | Retrieval Effectiveness (ANMRR) | | | |
|---|---|---|---|---|
| Group | Case 1 | Case 2 | Case 3 | Case 4 |
| Animation | 0.3869 | 0.3506 | 0.2887 | 0.2994 |
| Video | 0.3448 | 0.2290 | 0.1792 | 0.1941 |
| Average | 0.3659 | 0.2898 | 0.2339 | 0.2467 |

According to the above trial test, the case 2, wherein a part of the moving object is weighted, shows enhanced retrieval effectiveness compared to the case 1, wherein the centroid of the object is weighted. Furthermore, optimal retrieval effectiveness is achieved when both of the case 1 and the case 2 are concurrently applied together. The cases 3 and 4 represent cases of optimal retrieval effectiveness.

The inventive method as described above can be implemented by storing instructions on a computer interpretable recording medium such as a CD-ROM, a RAM, a ROM, a floppy disk, a hard disk, or a magneto-optical disk.

The present invention has an advantage of retrieving accurately a user wanted image sequence because an object included in video data estimates a similarity in moving shapes with use of a shape variation descriptor coefficient, thereby being able to recognize the image sequence data in which a part of an object is in motions or partial shape variations of the object are diverse even in a smaller number of frames with regardless of size, color and texture. Also, since the present invention is able to describe simultaneously information on the object shape and motion, it is possible to distinguish the objects of which shapes are different but move in an identical trajectory. Furthermore, the inventive shape variation descriptor, as like human perceptions, gives a weight to the shape change, i.e., parts of information about shape and motion of the object, instead of merely considering the centroid of the object, thereby improving the retrieval effectiveness.

While the present invention has been described with respect to certain preferred embodiments, it will be apparent to those skilled in the art that various changes and modifications may be made without departing from the scope of the invention as defined in the following claims.

The invention claimed is:

1. A method for extracting a shape variation descriptor in order to retrieve content-based image sequence data that express motions of an object, comprising the steps of:
   (a) selecting a predetermined number of the frames from the image sequence data;
   (b) transforming the frame into an object frame including information about only the object that is separated from a background of the frame;
   (c) aligning the object into a predetermined location of the frame and generating an aligned frame;
   (d) superposing a number of the aligned frames so as to generate one frame, that is, a shape variation map (SVM) including information about motions of the object and information about shapes of the object; and
   (e) extracting the shape variation descriptor with respect to one SVM.

2. The method as recited in claim 1, wherein the step (a) includes the step of:
   selecting N numbers of the consecutive frames from the image sequence data.

3. The method as recited in claim 2, wherein the step (a) further includes the step of:
   selecting M numbers of the frames obtained by dividing the N numbers of the consecutive frames by a predetermined period T.

4. The method as recited in claim 2, wherein the step (a) includes the step of:
   selecting M numbers of the frames that have larger variations in the motions of the object among the N numbers of the frames.

5. The method as recited in claim 1, wherein the step (b) includes the steps of:
   (b1) discarding information on the background included in the selected frame; and
   (b2) performing binarization of the object which is the image included in the frame after the information on the background being discarded.

6. The method as recited in claim 5, wherein the step (b2) includes the step of assigning to pixels included in the object values obtained in accordance with an equation as:

$$V_i(x, y) = \begin{cases} 1, \text{ if } (x, y) \in \text{ object region} \\ 0, \text{ others} \end{cases}$$

where, $V_i(x,y)$ represents a value assigned to a pixel of an ith frame among the selected frames in the step (a).

7. The method as recited in claim 6, wherein the step (d) includes the step of:
   accumulating the values assigned to the pixels of the frame in accordance with an equation as:

$$SVM(x, y) = \sum_{i=1}^{M} V_i(x, y)$$

where, $SVM(x,y)$ is a value assigned to the pixel of the SVM generated in the step (d).

8. The method as recited in claim 7, wherein the step (d) further includes the step of:

normalizing the accumulative values.

9. The method as recited in claim 8, wherein the accumulative values are normalized in a grayscale ranging from 0 to 1.

10. The method as recited in claim 1, wherein the step (c) includes the steps of:

(c1) calculating a centroid of the object separated from the background; and (c2) shifting the object to make a coordinate of the centroid of the object be identical to an origin of the frame.

11. The method as recited in claim 1, wherein the step (d) includes the step of:

normalizing the size of the image with respect to the SVM.

12. The method as recited in claim 1, wherein the step (e) includes the shape variation descriptor with respect to the SVM that is extracted in accordance with an angular radial transform (ART) defined by an equation as:

$$F_{nm} = <V_{nm}(\rho, \theta), f(\rho, \theta)>$$
$$= \int_0^{2\pi} \int_0^1 V_{nm}^*(\rho, \theta), f(\rho, \theta) p\, d\rho\, d\theta$$

where, $F_{nm}$ is an ART coefficient of order n and m, n and m are integer numbers, $f(\rho,\theta)$ is an image function in a polar coordinates, and $V_{nm}(\rho,\theta)$ is a basis function that can be expressed in a multiply of a function of a circumferential direction and that of a semi-circumferential direction.

13. The method as recited in claim 1, further comprising the steps of:

(f) with respect to the generated one SVM, inversing the pixel values of the-object part without the background so as to generate one frame, that is, negative shape variation map (NSVM) expressed by an equation as:

$$NSVM(x, y) = \begin{cases} GS - SVM(x, y), & \text{if } SVM(x, y) \neq 0 \\ 0, & \text{others,} \end{cases}$$

where, NSVM(x, y) is a value assigned to a pixel of the SVM and the SVM is normalized with the grayscale [0, GS]; and (g) extracting a shape variation descriptor with respect to the generated one NSVM.

14. The method as recited in claim 13, wherein the step (f) includes the shape variation descriptor with respect to the generated NSVM that is extracted in accordance with an equation as:

$$F_{nm} = <V_{nm}(\rho, \theta), f(\rho, \theta)>$$
$$= \int_0^{2\pi} \int_0^1 V_{nm}^*(\rho, \theta), f(\rho, \theta) p\, d\rho\, d\theta$$

where, $F_{nm}$ is an ART coefficient of order n and m, n and m are integer numbers, $f(\rho,\theta)$ is an image function in a polar coordinates, and $V_{nm}(\rho,\theta)$ is a basis function that can be expressed in a multiply of a function of a circumferential direction and that of a semi-circumferential direction.

15. A method for retrieving image sequence data on a basis of a static shape variation and a dynamic shape variation, the method comprising the steps of:

a) receiving a query image; and b) retrieving one of images stored in a database based on a similarity between a query image defined by equations as:

$$D_{SSV}(Q, D) \sum_i \|M_{SSV,Q}[i] - M_{SSV,D}[i]\|$$

$$D_{DSV}(Q, D) \sum_i \|M_{DSV,Q}[i] - M_{DSV,D}[i]\|$$

where, Distance(Q,D), $M_{SSV,Q}[i]$, $M_{SSV,D}[i]$, $M_{DSV,Q}[i]$, and $M_{DSV,D}[i]$ represent a similarity, an ith characteristic of the query image abbreviated as static shape variation[i], an ith characteristic of the comparative image stored at the database abbreviated as static shape variation[i], an ith characteristic of the query image abbreviated as dynamic shape variation[i] and an ith characteristic of the comparative image abbreviated as dynamic shape variation[i], respectively.

16. A computer readable recording medium storing instructions for executing a method for extracting a shape variation descriptor of a content-based retrieval system, the method comprising the steps of:

(a) selecting a predetermined number of the frames from the image sequence data;

(b) transforming the frame into an object frame that includes information about only the object that is separated from a background of the frame;

(c) aligning the object into a predetermined location of the frame and generating an aligned frame;

(d) superposing a number of the aligned frames so as to generate one frame, that is, a shape variation map (SVM) including information about the object motion and information about the object shape; and (e) extracting the shape variation descriptor with respect to one SVM.

17. The computer readable recording medium as recited in claim 16, wherein the said step (a) includes the step of:

selecting N numbers of the consecutive frames from the image sequence data.

18. The computer readable recording medium as recited in claim 17, wherein said step (a) further includes the step of:

selecting M numbers of the frames obtained by dividing the N numbers of the consecutive frames by a predetermined period T.

19. The computer readable recording medium as recited in claim 17, wherein said step (a) includes the step of:

selecting M numbers of the frames that have larger variations in the motions of the object among the N numbers of the frames.

20. The computer readable recording medium as recited in claim 16, wherein said step (b) includes the steps of:

(b1) discarding information on the background included in the selected frame; and (b2) performing binarization of the object which is the image included in the frame after the information on the background being discarded.

21. The computer readable recording medium as recited in claim 20, wherein the step (b2) includes the step of assigning to pixels included in the object values obtained in accordance with an equation as:

$$V_i(x, y) = \begin{cases} 1, & \text{if } (x, y) \in \text{object region} \\ 0, & \text{others} \end{cases}$$

where, $V_i(x,y)$ represents a value assigned to a pixel of an ith frame among the selected frames in the first instruction.

22. The computer readable recording medium as recited in claim 21, wherein said step (d) includes the step of:
accumulating the values assigned to the pixels of the frame in accordance with an equation as:

$$SVM(x, y) = \sum_{i=1}^{M} V_i(x, y)$$

where, $SVM(x,y)$ is a value assigned to the pixel of the SVM generated in the step (d).

23. The computer readable recording medium as recited in claim 22, wherein the step (d) further includes the step of:
normalizing the accumulative values.

24. The computer readable recording medium as recited in claim 23, wherein the normalization is performed in a grayscale ranging from 0 to 1.

25. The computer readable recording medium as recited in claim 16, wherein said step (c) includes the steps of:
(c1) calculating a centroid of the object separated from the background; and
(c2) shifting the object to make a coordinate of the centroid of the object be identical to an origin of the frame.

26. The computer readable recording medium as recited in claim 16, wherein the step (d) includes the step of:
normalizing the size of the image with respect to the SVM.

27. The computer readable recording medium as recited in claim 16, wherein said step (e) includes the shape variation descriptor with respect to the SVM that is extracted in accordance with an angular radial transform (ART) defined by an equation as:

$$F_{nm} = <V_{nm}(\rho, \theta), f(\rho, \theta)>$$
$$= \int_0^{2\pi} \int_0^1 V_{nm}^*(\rho, \theta), f(\rho, \theta) \rho \, d\rho \, d\theta$$

where, $F_{nm}$ is an ART coefficient of order n and m, n and m are integer numbers, $f(\rho,\theta)$ is an image function in a polar coordinates, and $V_{nm}(\rho,\theta)$ is a basis function that can be expressed in a multiply of a function of a circumferential direction and that of a semi-circumferential direction.

28. The computer readable recording medium as recited in claim 16, further comprising the steps of:
(f) with respect to the generated one SVM, inversing the pixel values of the object part without the background so as to generate one frame, that is, negative shape variation map (NSVM) expressed by an equation as:

$$NSVM(x, y) = \begin{cases} GS - SVM(x, y), & \text{if } SVM(x, y) \neq 0 \\ 0, & \text{others,} \end{cases}$$

where, $NSVM(x, y)$ is a value assigned to a pixel of the SVM and the SVM is normalized with the grayscale [0, GS]; and
(g) extracting a shape variation descriptor with respect to the generated one NSVM.

29. The computer readable recording medium as recited in claim 28, wherein the shape variation descriptor with respect to the NSVM is extracted in accordance with an equation as:

$$F_{nm} = <V_{nm}(\rho, \theta), f(\rho, \theta)>$$
$$= \int_0^{2\pi} \int_0^1 V_{nm}^*(\rho, \theta), f(\rho, \theta) \rho \, d\rho \, d\theta$$

where, $F_{nm}$ is an ART coefficient of order n and m, n and m are integer numbers, $f(\rho,\theta)$ is an image function in a polar coordinates, and $V_{nm}(\rho,\theta)$ is a basis function that can be expressed in a multiply of a function of a circumferential direction and that of a semi-circumferential direction.

30. A computer readable recording medium storing instructions for executing a method for retrieving image sequence data on a basis of a static shape variation and a dynamic shape variation in a processor of a content-based retrieval system, the method comprising the steps of:
a) receiving a query image; and
b) retrieving one of images stored in a database based on a similarity between a query image defined by equations as:

$$D_{SSV}(Q, D) \sum_i \|M_{SSV,Q}[i] - M_{SSV,D}[i]\|$$
$$D_{DSV}(Q, D) \sum_i \|M_{DSV,Q}[i] - M_{DSV,D}[i]\|$$

where, Distance(Q,D), $M_{SSV,Q}[i]$, $M_{SSV,D}[i]$, $M_{DSV,Q}[i]$, and $M_{DSV,D}[i]$ represent a similarity, an ith characteristic of the query image abbreviated as static shape variation[i], an ith characteristic of the comparative image stored at the database abbreviated as static shape variation[i], an ith characteristic of the query image abbreviated as dynamic shape variation[i] and an ith characteristic of the comparative image abbreviated as dynamic shape variation[i], respectively.

* * * * *